Figure 7:
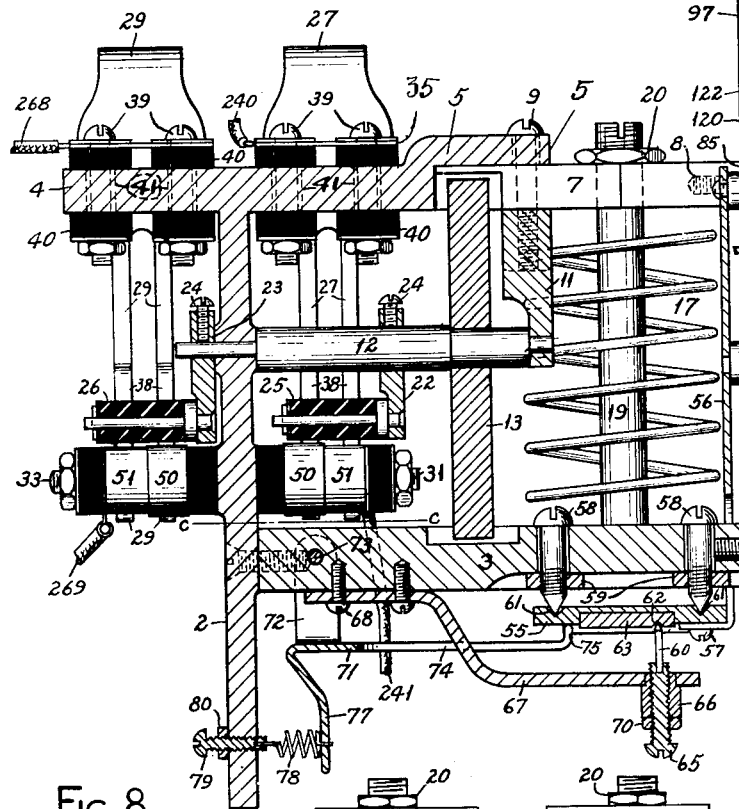

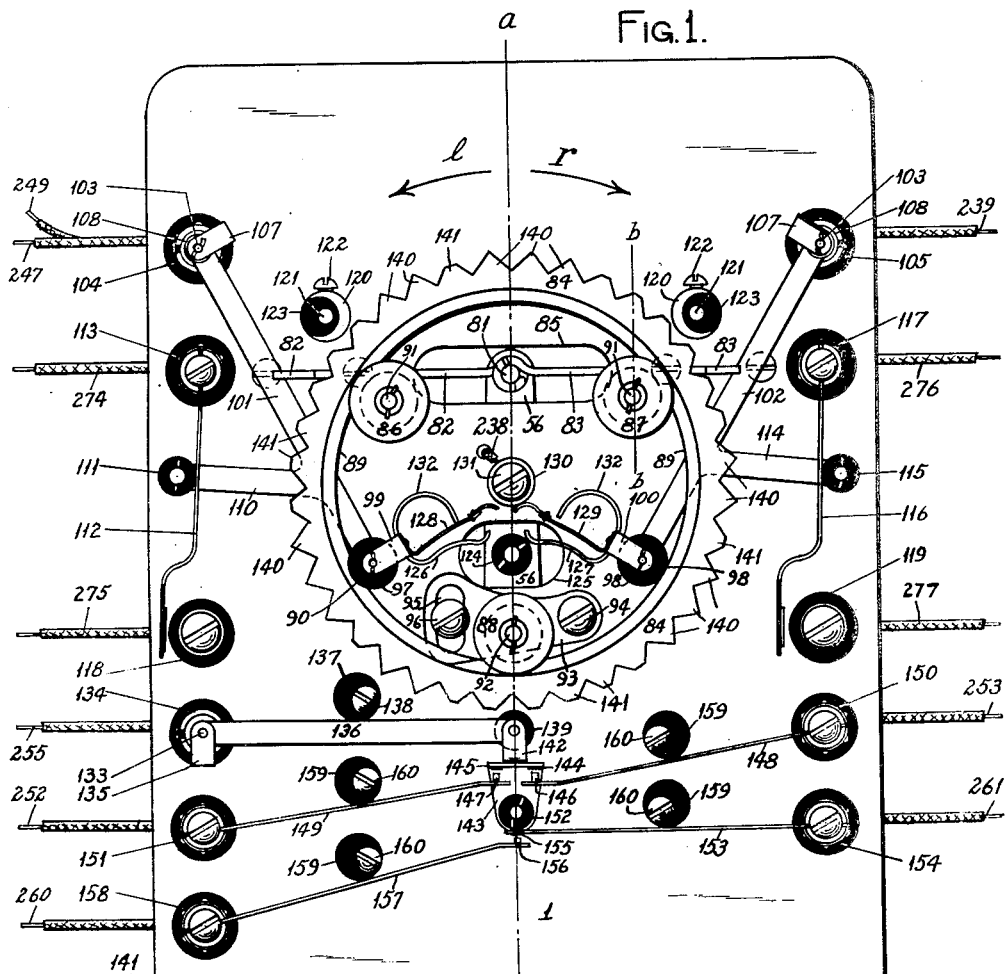

Step by step. R. C. LEAKE.
ANSWER BACK MECHANISM.
APPLICATION FILED MAR. 25, 1915.

1,363,796. Patented Dec. 28, 1920.
7 SHEETS—SHEET 2.

WITNESSES: INVENTOR.
George J. Whitney Richard C. Leake
Alvin K. Goodwin BY Lyman E. Dodge
ATTORNEY.

R. C. LEAKE.
ANSWER BACK MECHANISM.
APPLICATION FILED MAR. 25, 1915.

1,363,796.

Patented Dec. 28, 1920.

7 SHEETS—SHEET 3.

WITNESSES:
George T. Whitney.
Alvin K. Goodwin.

INVENTOR.
Richard C. Leake
BY Lyman E. Dodge
ATTORNEY.

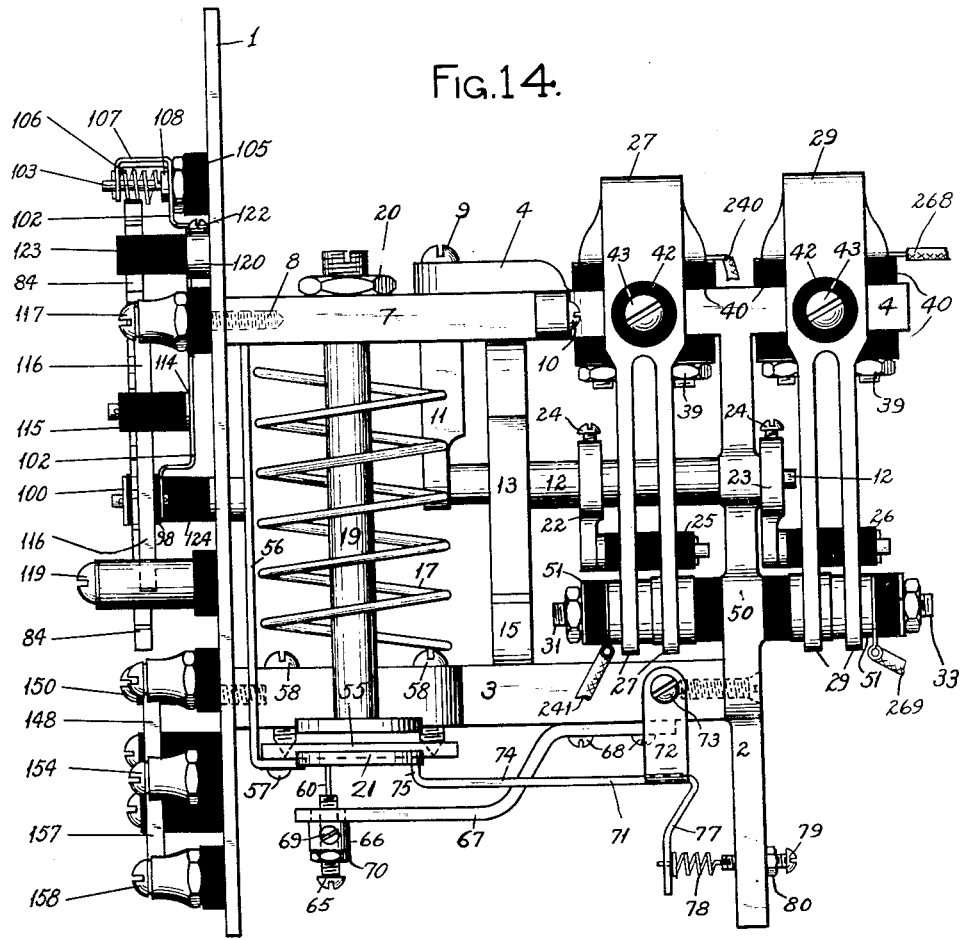
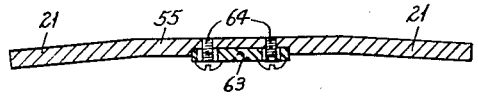
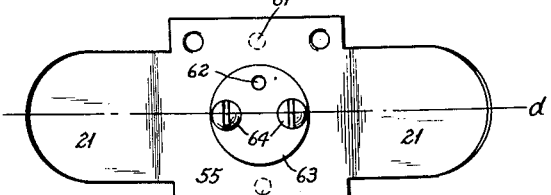
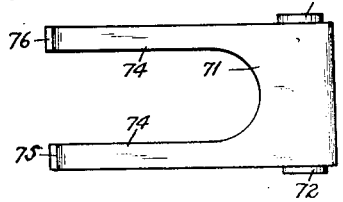

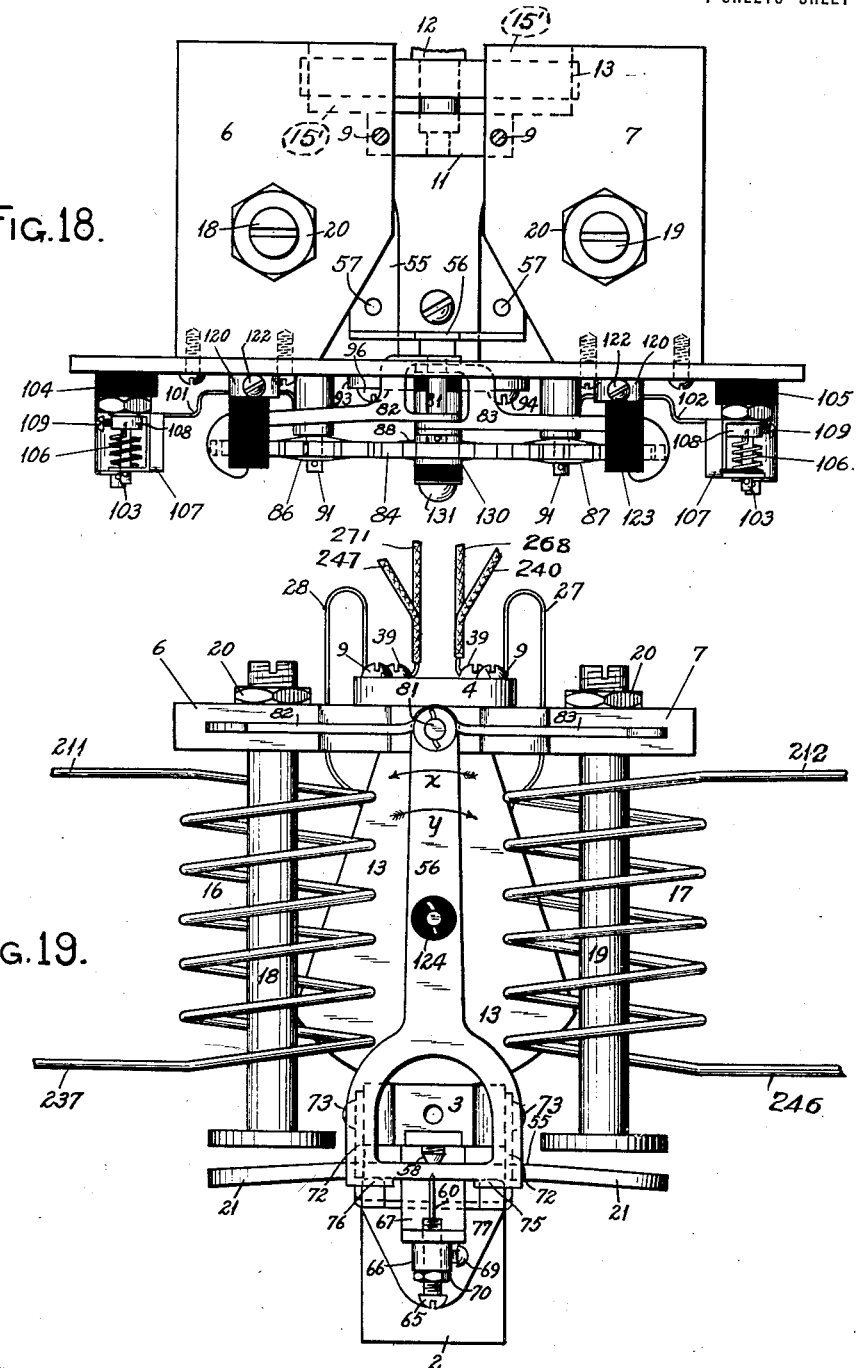

R. C. LEAKE.
ANSWER BACK MECHANISM.
APPLICATION FILED MAR. 25, 1915.

1,363,796.

Patented Dec. 28, 1920.
7 SHEETS—SHEET 6.

WITNESSES:
George J. Whitney
Alvin K. Goodwin

INVENTOR
Richard C. Leake
BY
Lyman E. Dodge
ATTORNEY

UNITED STATES PATENT OFFICE.

RICHARD C. LEAKE, OF ROCHESTER, NEW YORK, ASSIGNOR TO GENERAL RAILWAY SIGNAL COMPANY, OF GATES, NEW YORK, A CORPORATION OF NEW YORK.

ANSWER-BACK MECHANISM.

1,363,796.   Specification of Letters Patent.   Patented Dec. 28, 1920.

Application filed March 25, 1915. Serial No. 16,863.

*To all whom it may concern:*

Be it known that I, RICHARD C. LEAKE, a citizen of the United States, and a resident of the city of Rochester, in the county of Monroe and State of New York, have invented a new and useful Answer-Back Mechanism, of which the following is a specification.

This invention relates to that class of devices known as "answer back" mechanisms which responsively give attest of the position, condition, or indication of a railway signal or light or other remote control device to a train despatcher or other person at a distant point causing said position, condition, or indication, and preferably under influence of electric circuits.

One of the objects of this invention is to devise an answer back mechanism which will give at a distant point a repeated indication of the operated condition of a remote control device.

A further object of the invention is to devise an answer back mechanism which will give at a distant point a persistent indication of the operated condition of a remote control device, and which can be controlled from said distant point to discontinue said indication.

A further object is to devise an answer back mechanism which will give at a distant point a persistent indication whenever a remote control device changes its operated condition.

A further object is to devise an answer back mechanism by which may be obtained at a distant point, verifying attests of the operated condition of a remote control device without changing the operated condition of said device.

A further object is to devise a simple and inexpensive construction by causing a comparatively small number of coacting parts to perform numerous important functions, and so to construct and combine certain contacting parts that they shall protect each other from destructive sparking where electric circuits are more or less frequently made and broken.

The invention is herein described relatively to its use with railway semaphore signals, but it obviously may be used with other remote control devices or in other situations where its functions may advantageously be performed.

The various objects and functions and advantages of the invention will more fully appear in the following detailed description, and the novelty of the invention will be particularly pointed out in the appended claims.

Reference is made to the accompanying drawings forming part of this specification, and in which similar numerals indicate corresponding parts in the several views.

Figures 8, 9, 10:
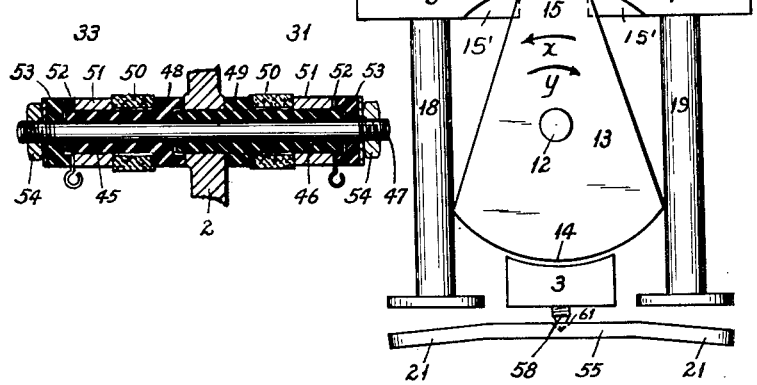
Figure 11:
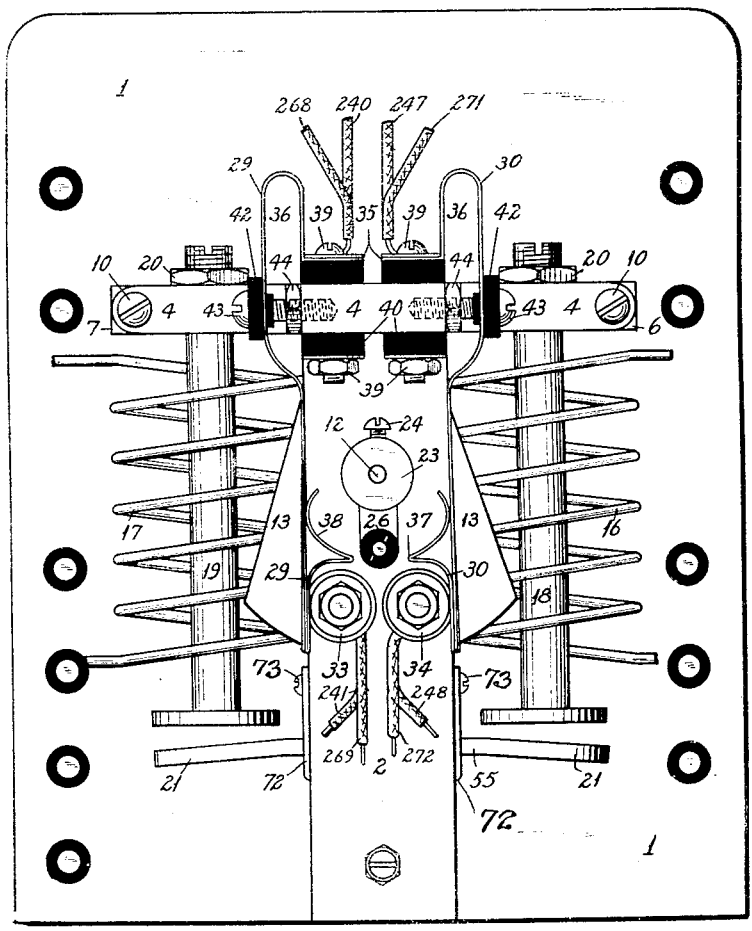
Figure 12:
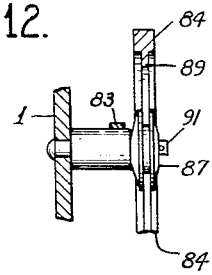
Figure 13:
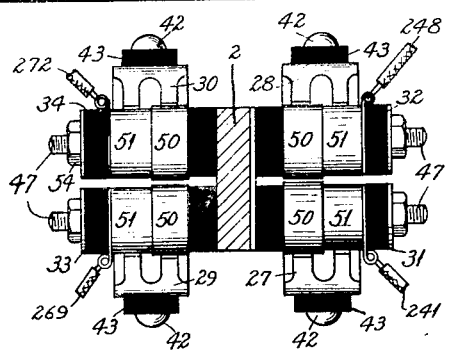
Figure 20:
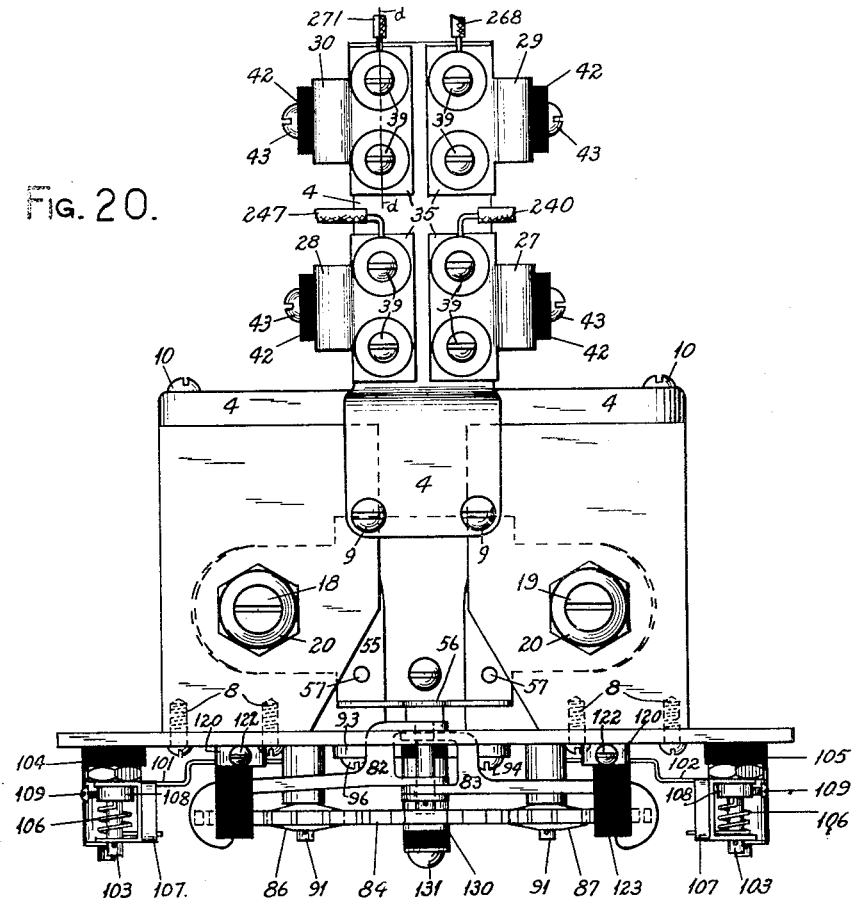
Figure 21:
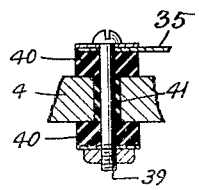
Figure 22:
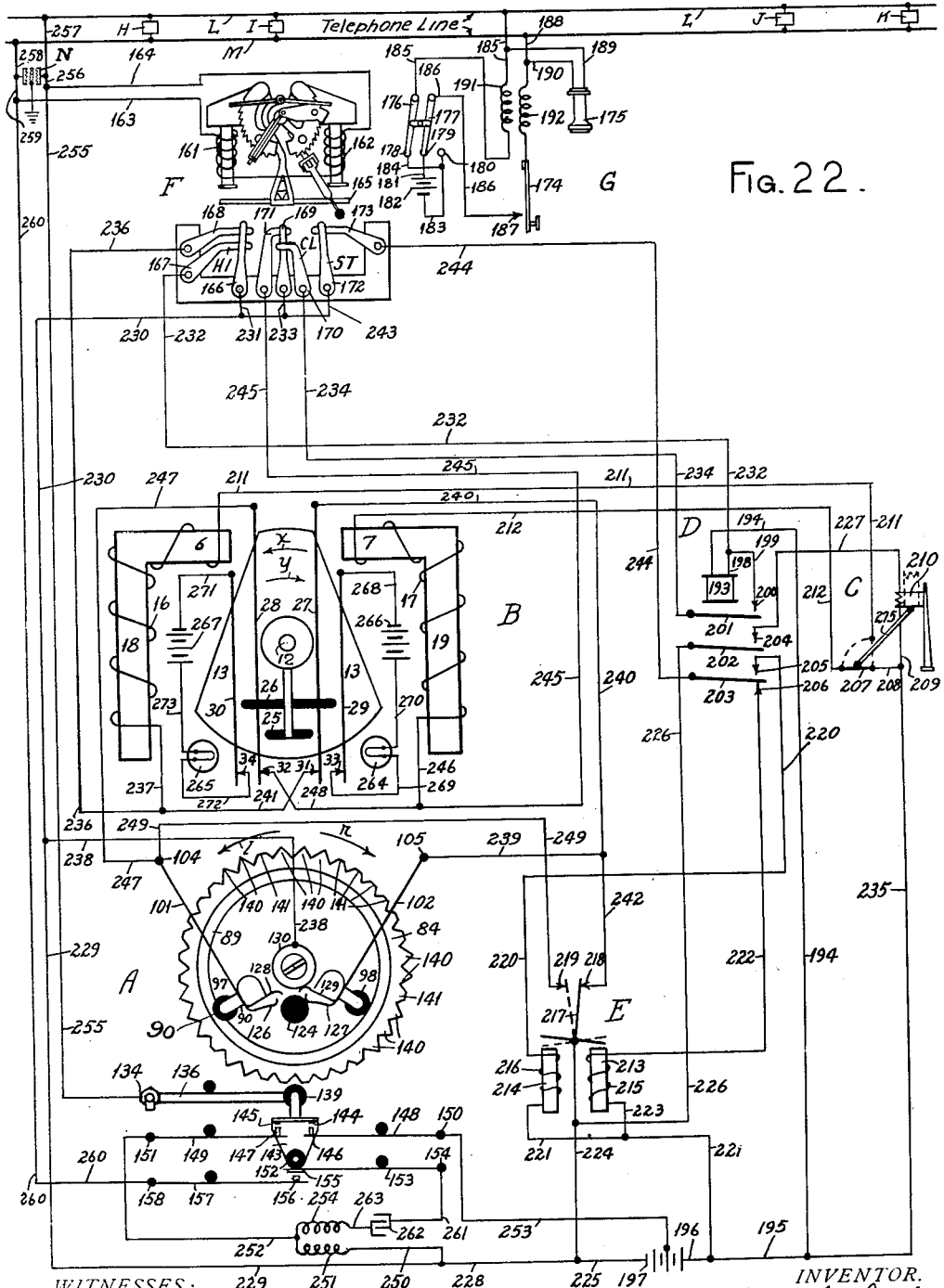

Figure 1, is a front elevation of the answer back mechanism; Fig. 2, is a detail front view of the answer wheel; Fig. 3, is a central vertical section of said wheel; Fig. 4, is an edge view of one of the roller-carrying arms which coacts with the answer wheel; Fig. 5, is a face view of one of the answer wheel supporting rollers; Fig. 6, is an edge view of said roller; Fig. 7, is a central vertical sectional view taken on the line *a—a* in Fig. 1; Fig. 8, is a longitudinal vertical section through one alined pair of control contacts and their frame support; Fig. 9, is a diagrammatic view with certain parts removed and shows the tri-polar magnet and its armatures; Fig. 10, is a rear elevation of the primary armature balancing device; Fig. 11, is a rear elevation of the answer back mechanism; Fig. 12, is a detail vertical sectional view taken on the line *b—b* in Fig. 1; Fig. 13, is a bottom plan of the rear control contacts with the supporting frame portion in horizontal section on the line *c—c* in Fig. 7; Fig. 14, is a side elevation of the mechanism in reversed position relatively to Fig. 7; Fig. 15, is a longitudinal vertical section of the primary armature; Fig. 16, is a bottom plan view thereof; Fig. 17, is a top plan of the primary armature balancing device; Fig. 18, is a plan view of upper front parts of the mechanism; Fig. 19, is a front view, more particularly showing the primary armature and tri-polar magnet, the front frame plate being removed; Fig. 20, is a more rearwardly extending plan view than is shown in Fig. 18, to more clearly show the magnet pole fastenings and the rear spring contacts; Fig. 21, is a detail vertical section through the upper fastenings of one of said contacts, taken on the line *d—d* in Fig. 20; and Fig. 22, is a diagram of circuits illustrating coaction of the answer back mechanism with certain auxiliary apparatus.

The supporting frame of the mechanism comprises a front non-magnetic plate 1, and a rear vertical leg 2, to and between which a lower magnetic plate or pole piece 3 is fixed preferably by screws, as indicated in Figs. 7 and 14, of the drawings. The frame leg 2 carries a head or top plate portion 4 which is formed with an offset lip or lug 5 which supports the rear parts of two pole pieces 6, 7, which coact with the lower pole piece 3, and with cores and wire coils and a primary armature and a control armature to establish certain electro-magnetic circuits hereinafter described. Each pole piece 6, 7, is fastened preferably by two screws 8, passed into it through the front plate 1, a screw 9 passed vertically through the top plate 4, and a screw 10 passed forward horizontally through a lateral extension of frame portion 4 into the outer rear corner of the corresponding pole piece. The two pole fastening screws 9, 9 pass freely through the pole pieces 6, 7, but are threaded into a non-magnetic hanger 11 in which is journaled the forward end of a shaft 12, the rear end of which is journaled in the frame leg 2. This shaft 12 fixedly carries a magnetic plate 13, which is an oscillatory armature coacting directly with the pole pieces 3, 6, 7, to operate a system of electric contact controls hereinafter more fully explained. The armature 13, which is herein termed the control armature, has a lower convex edge 14, opposing the adjacent curved parallel face of the pole piece 3, and a shorter upper convex edge 15 which may oscillate in concave corner recesses 15′, formed in the respective pole pieces 6, 7. During oscillation of the armature 13 its edge 14 compasses like lines of force at the pole piece 3, whereat there is practically an invariable magnetic reluctance, but at its upper edge 15, there normally is, at either pole piece 6 or 7, a maximum magnetic reluctance, which gradually decreases as upper edge 15 of the armature rocks over toward these pole pieces 6, 7, which may be energized by electric current passing through the corresponding wire coil 16 or 17 which respectively surround cores 18, 19, which are threaded into the pole pieces 6 and 7 to which the cores may be fastened at any desired vertical adjustment by lock nuts 20, for holding their preferably enlarged foot-plate portions in proper relation to opposite lower end parts 21, 21, of the oscillatory primary armature 55. The illustrated tripolar magnet comprising the upper pole pieces 6, 7, and one common lower pole piece 3, is a preferred more simple operative equivalent of two electromagnets, each having its own upper and lower pole pieces. Before particularly describing this primary armature 55 and its directly associated parts, the controls and the multiple contacts directly actuated by said controls from the oscillatory control armature 13, will be described with more special reference to Figs. 7, 8, 11, 13, 14 and 19, of the drawings.

The control armature shaft 12 carries two pendent arms 22, 23, shown fixed by set screws 24, and respectively carrying insulating contact controls 25, 26, which may have any desired form but are shown as preferred antifriction hard rubber rollers respectively arranged between opposing pairs of two-limbed elastic contact plates 27, 28 and 29, 30, adapted for making or breaking electric circuits by coaction with respective pairs of binding posts 31, 32 and 33, 34 held to the rear leg 2 of the frame. These contact plates 27, 28, 29, 30, have substantially similar general form and as best shown in Fig. 11 each includes a head portion having a horizontal attaching flange 35 from which the contact plate is bent upward and outward and then downward and inward to provide an upper elastic loop 36, from which the bifurcated limb portions depend to a point below the opposed binding post, and thence the contact limbs are shown bent upward upon themselves and then curved upward and inward above and clear of the binding post to a point 37 slightly distant from the lower peripheral portion of the contact control, 25 or 26. Above the point 37 the contact limbs are bent upward and outward at 38 in a curve having such radius that after the control 26 or 27 strikes the point or bend at 37 and forces the contact away from its binding post to promptly break a circuit the control will ride up easily against and within the curved contact portion 38 to still hold the contact disconnected from the binding post without unduly obstructing the full range of oscillation of the energized control armature 13 by excessive friction of the controls on the contacts, and also preventing overstraining of the contact limbs by giving them only the limited range of lateral movement necessary to positively break the electric circuit. The flange 35 of each contact 27, 28, 29, 30, is fixed to the rearwardly projecting central part of the frame piece 4 by a pair of vertical bolts 39, with interposed insulating blocks 40 and interior sleeve 41 (see Fig. 21). Near the base of its head loop 36, each contact plate has a hole through which passes a stud on an insulating sleeve 42 (see Fig. 11) through which a screw 43 passes laterally into the frame part 4, and on the screw is fitted a lock nut 44. The screw and lock nut 43, 44 permit regulation and maintenance of proper pressure of the contact plates upon the opposed binding posts.

The illustrated arrangement of the opposing pairs of contacts and their intermediate controls 25, 26 at the respective front and rear of the frame leg 2, permits the binding posts 31, 32, 33 and 34 to be economically made and securely supported in two alined insulated pairs, as more clearly shown in Figs. 8 and 13 of the drawings, Fig. 8, being a section through either of the two alined pairs of posts which may here be presumed to be the posts 31, 33. Each duplex binding post construction includes two interior insulating sleeves 45, 46, placed upon an axial bolt 47. Sleeve 45 has next the frame leg 2 an enlargement 48 which bears against one face of the leg 2 and into which fits the inner end of the sleeve 46, which also snugly fits a bore made in the leg 2. Sleeve 46 also has an enlargement 49, giving it a shoulder contact with the opposite face of the frame leg 2. On each insulating sleeve 45, 46, are placed a graphite or carbon contact ring 50, and an adjoining metal contact ring 51 having less diameter than the ring 50. Outside of and in contact with each metal ring 51, is preferably placed a circuit wire connector shown as a metal washer 52, fitted on the insulating sleeve and having an eye to receive the circuit wire. Outside of each wire connector 52 is placed on the corresponding sleeve an insulating collar 53 next which is a protective metal washer receiving the pressure of fastening nuts 54, screwed upon corresponding end of the bolt 47. The nuts 54 when tightened bind together all parts of both contact posts 31, 33, and securely fasten them to the frame leg 2, in proper operative relation to the opposing contact limbs and the contact controls 25, 26. Fig. 13, more particularly shows that the two limbs of each contact 27, 28, 29, 30, lie in different vertical planes so as to normally engage the respective graphite and metal rings 50, 51, of unequal diameters, and, therefore, the contact limbs engaging the smaller metal rings 51 lie nearer the contact controls 25, 26, than do the contact limbs engaging the larger graphite rings 50, so that as the contact plates are moved laterally by the controls the circuit will first be broken at the smaller readily conductive metal rings 51, which may be pitted by sparking, before it will be finally broken at the larger more highly resisting non-pitting graphite rings 50, whereby destructive sparking is avoided.

The primary armature 55 has end parts 21, 21, opposing the magnet cores 18, 19, and an upwardly extending front arm 56, which may be integral with the armature 55, but is shown separately made and fixed thereto by screws 57 passed through rearwardly ranging flanges formed at opposite edge parts of the broadened lower portion of arm 56 which has an opening through which passes the narrowed front end of the fixed pole piece 3, which thus does not prevent free lateral oscillation of the armature 55 upon its central anti-friction bearings. These bearings comprise two upper conically pointed headed screws 58, 58 of magnetic material which pass downward freely through larger holes in the pole piece 3, and below it have magnetic nuts 59, which may be tightened to steadily hold the screws 58 to the pole piece 3 after they are nicely adjusted in perfect alinement relatively to a subjacent pivot pin 60, which supports the balanced armature from below. The conical points of screws 58 enter more obtuse conical recesses 61, formed in the upper face of the armature 55, and the upper conical end of pin 60, enters a more obtuse conical recess 62 in a magnetic conductive disk 63, having holes larger than the two screws 64, 64, which hold it snugly but pivotally in a recess formed in the lower face of the armature 55. The lower end of bearing pin 60 enters a recess in the upper end of a screw 65 which is threaded into a bushing 66, the reduced upper end of which is fixed in a bore of a bracket 67, the rear upbent portion of which is fastened by screws 68 to the underside of the fixed pole piece 3. The pin 60, screw 65, bushing 66 and the bracket 67 may be made of magnetic material if desired and thus afford an additional path for magnetic flux to pass from the pole piece 3 to the armature 55. A set screw 69 in the bushing 66, and shown in Fig. 14, may be tightened on the screw 65 after it is properly adjusted vertically in the bushing, and a jam-nut 70 is preferably used on the screw 65 to lock the vertically adjusted screw for holding the lower primary armature bearing pin 60, at proper delicate vertical adjustment relatively to the upper conical armature bearings 58. A simple and efficient primary armature balancing device comprises a plate 71, having an opposing rear pair of upbent flanges 72, 72, which are fulcrumed on screw bearings 73 threaded into opposite edges of the pole piece 3, to which the plate 71 thus is pivoted to allow it to rock freely. The plate 71 is cut away thus providing two parallel horizontal limbs 74, 74, which respectively have similar upbent front end fingers 75, 76, which normally bear upward upon the lower face of the primary armature plate 55 at opposite sides of its central bearings 58, and 60. The bracket 67 passes upward between the two plate limbs 74; and does not prevent free rocking of the plate 71 by oscillation of the primary armature 55 to either the right or left hand. The plate 71, has a rear pendent flange 77 into which passes the forward end of a spiral compression spring 78, the rear end of which enters a screw 79 threaded into the frame leg 2, and carrying a jam-nut 80 by which the screw may be locked after it has been adjusted to properly regulate the tension of the spring to cause the plate fingers 75, 76 to bear with ample regulated equal pressure upon the primary armature 55, to promptly assure its return to the neutral position after breaking of the circuit which caused tilting of the armature toward either pole pieces 6, 7, of the tri-polar magnet.

To the upper end of the primary armature arm 56 is fixed a forwardly projecting pin 81, which is a common fulcrum for the inner forked ends of two respective left and right hand pawls 82, 83, the outer shouldered heads of which are adapted to engage peripheral teeth on a revoluble ring 84, herein termed the "answer wheel", and to impart intermittent rotative movements to said wheel in either clockwise or counter-clockwise direction. The frame plate 1 is slotted at 85, to accommodate lateral movement of the forked ends of the pawls 82 and 83 as the pawls are bodily moved to the right or left by oscillations of the primary armature 55 which supports them. The answer wheel 84 is revolubly supported upon three grooved anti-friction rollers, 86, 87, 88, engaging a track 89 formed around the inner periphery of the wheel and provided with a notch 90. The rollers 86, 87, simply rotate on bearing pins 91, fixed to the frame plate 1, but the roller 88 rotates upon a pin 92, fixed to a vertically adjustable plate bearing 93, which is fulcrumed on a screw 94, fixed to the frame plate 1, and has a curved slot 95, through which a fastening screw 96, passes into said plate. By vertically adjusting the loosened bearing 93, all three bearing rollers, 86, 87, 88, may be relatively located to assure true intermittent rotative movements of the answer wheel on the rollers. The adjustable roller 88, also provides for readily substituting one answer wheel 84 for another wheel having differently formed or arranged peripheral teeth as any desired code of answer back attests of signal movements may require. Two respective left and right hand insulating rollers 97, 98, are adapted to run on the answer wheel track 89, said rollers being journaled in laterally ranging yokes 99, 100, integral with the lower ends of respective left and right lever arms, 101, 102, which are fulcrumed on reduced pin portions 103, of two binding posts 104, 105, insulatingly held to the frame plate 1. The arms 101, 102, are each normally pressed laterally outward to hold their rollers 97, 98, to the answer wheel track 89 and cause either roller to enter the opposed track notch 90, as the wheel turns in opposite directions for electric circuit control purposes hereinafter more fully explained. A desirable means for pressing the rollers 97, 98, to the wheel track 89, comprises a coil spring 106 surrounding the pin 103 within a laterally ranging yoke 107, integral with the arm 101 or 102. One end of the spring engages the yoke 107, and its other end is fixed in a collar 108, which is revoluble on the pin 103, and is locked thereto by a screw 109, after the torsional pressure of the spring 106 upon the arm is properly regulated. The arm 101, fixedly carries a laterally extending finger 110, to the outer end of which is journaled an insulating roller 111, which normally bears against one side of a pendent conductive spring plate contact 112 held to a binding post 113 insulatingly fixed to the frame plate 1. The other arm 102, fixedly carries a laterally extending finger 114, to the outer end of which is journaled an insulating roller 115, normally bearing upon one side of a pendent conductive spring plate contact 116, held to a binding post 117, insulatingly fixed to the frame plate 1. The contacts 112, 116, normally press outward to the respective rollers 111, 115, and are respectively adapted to break and make electric circuits through binding posts 118, 119, insulatingly fixed to the frame plate 1, as controlled by movement of the contact rollers 97, 98, into and out of the notch 90 of the answer wheel track 89. Above the free end of each of the pawls 82, 83, is located an adjustable stop which preferably comprises a sleeve 123 of insulating material eccentrically fixed to a pin 121 which is journaled in a boss or stud 120 and which is clamped therein by a screw 122. By loosening the screw 122 and turning the sleeve 123, the limit of the upward movement of the corresponding pawl 82 or 83 may be accurately adjusted.

The pawls 82 and 83 rest upon the pins 91 which support the rollers 86 and 87, as best shown in Fig. 18; and consequently, when the upper end of the arm 56 is moved to the right as viewed in Fig. 18, while the pawl 82 engages one of the teeth in the outer periphery of the answer wheel 84 and moves inwardly and slightly upwardly with this tooth, the other pawl 83 moves outwardly away from and out of engagement with the teeth of the answer wheel 84, so that on the return movement of the upper end of the arm 56 to its middle position, the pawl 83 is not engaging the teeth on the answer wheel and will not return the answer wheel back to its former position. A similar action occurs when the upper end of the arm 56 is moved to the left, as viewed in Fig. 18, the pawl 83 being effective to advance the answer wheel, while the pawl 82 moves idly.

To the primary armature arm 56, is journaled upon insulating bearings a non-conductive roller 124, and there is a slot 125 in the frame plate 1, permitting free lateral movement of the roller 124 which may strike the inner curved free end of either one of two non-resilient fingers 126, 127, respectively, integral with the yokes 99, 100, carrying the rollers 97, 98, of the respective arms 101, 102. To the same yokes 99 and 100 also are fixed the ends of elastic conductive plate contacts 128, 129, preferably having renewable platinum-alloy curved end parts adapted to make and break electric circuit with a preferably cylindrical contact 130, insulatingly fastened to a screw 131, fixed to the frame plate 1. Each of the non-resilient fingers 126, 127, preferably has a curved rigid tail portion 132, against which the adjacent spring contact 128 or 129, normally stops when respectively disconnected from the contact 130. On a reduced pin portion 133 of a binding post 134 insulatingly fixed to the frame plate 1, is fulcrumed the outer yoke-shaped end 135, of a lever arm 136, and within this yoke shaped end 135 around the pin 133 is placed a coil spring, one end of which engages the yoke while its other end enters a collar which may be fastened by a set screw, after the spring torsion is properly adjusted, substantially as above described relatively to arms 101, 102, but here the spring normally holds the arm 136 upward to a stop 137 eccentrically held to the frame plate 1 by a screw 138 which when loosened permits eccentric adjustment of the stop 137 for holding an insulating roller 139 journaled at the free end of arm 136 in proper operative relation with opposing series of peripheral teeth 140 on the answer wheel 84, which have not been cut off at their ends like the remaining series of teeth 141, of said wheel. The shortened wheel teeth 141 will freely pass the roller 139 without lowering it and the arm 136, but the long teeth 140 will in passing depress this roller and arm for closing certain answer back circuits, as hereinafter more fully explained. The roller 139 is journaled in a yoke portion 142, of the arm 136, and to said yoke 142, is fixed an inverted L shaped conductive head plate 143, carrying two contacts 144, 145, which respectively oppose but are normally separated from contacts 146, 147, respectively held to elastic conductive plates 148, 149, secured to respective binding posts 150, 151, insulatingly fixed to the frame plate 1. The L shaped plate 143, also carries a non-conductive presser part, preferably a roller 152, which opposes the inner end of an elastic conductive plate 153, held to a binding post 154, insulatingly fixed to the plate 1. This plate 153 carries a contact 155 opposing but normally separated from a contact 156 on another elastic conductive plate 157 held to a binding post 158 insulatingly fixed to plate 1. Depression of the roller 139 and arm 136 by the full length teeth 140, of the answer wheel 84, will bring all three opposing pairs of contacts 144—146, 145—147 and 155—156 together for closing certain answer back electric circuits hereinafter mentioned. These three pairs of opposing contacts are relatively adjustable by means of eccentrically journaled stops 159, held by screws 160 to the frame plate 1, and acting on the respective contact plates 148, 149, 153, 157. This adjustment of these contact plates by stops 159 is made after the roller 139 has been properly adjusted by the eccentric stop 137 acting on the roller sustaining arm 136.

The illustrated example of an answer wheel 84, has three series of peripheral long and short teeth 140, 141, each series comprising three long teeth 140 spaced the distance of one short tooth 141, from two other long teeth 140. Each series of five teeth is arranged upon a peripheral wheel portion including one-third of the wheel circumference or an arc of one hundred and twenty degrees, which also is the space between the two arm carried rollers 97, 98, adapted to enter the wheel track notch 90.

As explained more fully hereinafter, the answer wheel 84 is automatically stopped in one position when the roller 97 is in the notch 90, and in the other position when the roller 98 is in said notch; and since the rotation of the answer wheel 84 from either one of these positions should, in order that the correct indications may be given, commence one of the code sequences or series of five teeth, it is necessary to space the rollers 97 and 98 apart for an arc of one hundred and twenty degrees, that is, the same arc as includes each series of five teeth. The answer wheel 84, when turned clockwise is adapted by depressing the roller 139 by its teeth 140, to close certain electric circuits including a telephone receiver, to give repeated distinctive "three-two" clicks audible at the telephone located at a central station, or train despatcher's office, whereat are also provided certain switches or selector key devices hereinafter more fully described and operable by the train despatcher who also listens for the answer back click signals at the telephone. When the answer wheel 84, rotates counter-clockwise the click signals will be reversed in order as the circuit closing roller 139 is depressed, thereby causing quite distinctive "two-three" clicks audible at the telephone. A different grouping of the relatively long and short teeth 140, 141, on different interchangeable answer wheels permits any desired or necessary distinctive click signals to be made audible at the train despatcher's telephone without change of standard operative parts of the answer back mechanism other than substituting one answer wheel for another. By manipulating certain electric circuits hereinafter mentioned the answer wheel 84, may be given a complete revolution either clockwise or counter-clockwise, thereby causing its long teeth 140 to depress roller 139 to give three distinctive repetitive verifying "three-two" or "two-three" answer back clicks audible at the telephone.

The relative operations of parts of the answer back mechanism and associated devices and the electric circuits now will be described with more special reference to the diagram shown in Fig. 22 of the drawings. In this diagram the letter A generally represents the answer wheel and its directly coacting electric contacts; the letter B generally represents the tri-polar magnet and its directly associated electric circuit controls; the letter C generally indicates a semaphore railway signal and its circuit breaker; the letter D generally represents a signal controlling relay and its armatures and contacts; the letter E generally indicates a polarized stop relay and its armature and contacts; the letter F generally indicates a selector device, such, for instance as that shown in United States Patent No. 1,118,120, granted on November 24th, 1914, to Maurice F. Geer and Richard C. Leake, and adapted to control electric circuits influencing operations of the parts indicated at A, B, C, D, E; the letter G generally indicates an equipment available at a train despatcher's office for controlling operations of distinct parts A to F and for receiving telephonically the attests of the answer back mechanism relatively to adjustments or indications of the signal, and the letters H, I, J, K, respectively indicate equipments including devices A to F, which are installed at different stations or places along a railway line where they all are connected with the telephone line wires L, M. However it is to be understood that for each of the equipments designated by the letters H, I, J and K, the answer wheel 84 of the device A will be made up with different groupings of the relatively long and short teeth 140 and 141, as hereinbefore mentioned, so that the answer back indications received at the despatcher's office will be distinctive for each device. Any approved lightning arrester devices N are interposed between each selector F, and the respective line wires L, M, to protect all the devices F, B, A, E, D, C, from lightning possibly traversing said wires. Each selector F, which for present descriptive purposes may be considered similar to the selector shown, described and claimed in the above named United States Patent No. 1,118,120, granted to Geer and Leake, includes two magnetic cores respectively encircled by wire coils 161, 162, connected in series with each other and in circuit with wires 163, 164, which are indirectly connected to the line wires L, M, by the answer back circuit wires, as hereinafter described. An oscillatory armature 165 is arranged to be attracted by either magnet core under influence of a special series or code of positive and negative electric impulses which may be impressed upon the line wires by operation of a selector key of known class by the train despatcher, such a key for instance as that shown, described and claimed in the United States Patent No. 1,105,766, granted August 4th, 1914, to Maurice F. Geer and Richard C. Leake. As such key forms no part of this invention it is in the diagram substituted by a more simple pole changer and telegrapher's key in circuit with the line wires L, M. Each contact group of each selector F, is operable only by a certain combination of positive and negative impulses through the coils 161, 162, and this certain combination differs for each contact group of each selector it is desired to operate, in order to establish certain electric circuits causing operation of the signal and answer back mechanisms at different stations or places along a railway line. The contacts of each selector device preferably comprise three groups which for convenience are marked HI, CL and ST. The HI contacts when operated assure adjustment of a signal 210, to vertical position; the CL contacts when operated assure return of said signal to normal horizontal position, and the ST contacts when operated stop the telephonic attests of both signal positions or indications by the answer back mechanism, all as hereinafter more fully explained. It is contemplated that the signal 210 which is controlled from the central station, will, in practice, be clearly distinguishable from the automatic block signals and other signals as may be used along the railroad in question. The signal 210 may be made so distinguishable in different ways; but for simplicity this signal is illustrated as the well known semaphore signal which differs from the semaphore signal ordinarily used by having two notches in the end of the blade. Also, while it is not material so far as this invention is concerned, in the particular arrangement of parts and controlling circuits therefor illustrated, the vertical or operated position of the signal 210 is intended to indicate that the train should head in or take the siding; whereas the horizontal or biased position of said signal is intended to indicate that the train need not take the siding and may proceed along the main line. These indications and positions of the signal 210, while they are different from those ordinarily used for semaphore signals, have the advantage that current is not consumed when the signal is in the position which it has the greater part of the time, that is, in the horizontal position. In this connection it should be clearly understood that this invention is not limited to the type of signal 210 shown or to the particular indications hereinbefore described; and in fact, this invention is not limited in its useful applications to a signal of any type, but may be used with any form of device which it is desired to control from a distant point or central station, and it is intended to indicate this broad application by the use of the expression remote control device in the appended claims. There are three HI contacts, 166, 167, 168. Contact 166 is normally separated from contacts 167, 168, but is caused to touch both when the proper combination of impulses flows through the selector coils 161, 162, following operation of the circuit controlling key by the train despatcher. There also are three CL contacts, 169, 170, 171, the one 169 normally touching 170 and being separated from 171, and when operated by impulses controlled by the despatcher's selector key the contact 169 leaves 170 and touches contact 171. There are two ST contacts, 172, 173, normally separated but touching when operated by impulses controlled by the proper selector key.

The illustrated train despatcher's equipment G, includes the pole changer, the telegrapher's key 174, and the telephone receiver 175. The pole changer shown comprises two pivoted switches 176, 177, coupled for movement together and adapted for adjustment at their free ends to three contacts 178, 179, 180. The contact 179 is connected by wire 181 to the negative pole of a battery 182, the positive pole of which is connected by a wire 183 to the contact 180, and a wire 184 connects the contact 178 with the wire 183. The fulcrum of switch 176 is connected by a wire 185, to the line wire L, and the fulcrum of switch 177 is connected by a wire 186 to the key contact 187 and through said key may be connected in circuit by a wire 188, to the other line wire M. The telephone receiver 175, is connected in bridge by wires 189, 190, to the respective wires 185, 188, in which respectively are interposed two impedance coils or devices 191, 192, to subdue or minimize at the receiver 175, the click sounds of the key 174, and thus avoid disagreeable knocking at the train despatcher's ear. The impedance coils 191 and 192 may be, and preferably are, so proportioned and adjusted that they subdue or muffle the click sounds incident to the operation of the key 174, or the equivalent calling key, to an extent which will prevent these click sounds from interfering with or confusing the answer back attests, for the reason that although the sound incident to the operating of the key 174 or the equivalent calling key will be actually heard in the despatcher's telephone receiver it will be so muffled in tone as to be distinguished by an experienced operator from the answer back attests and if he so desires the despatcher may cause a selector call to be sent over the line while an answer back is being received, thereby increasing the capacity of the line to operate a number of signals or other remote control devices in a given time. When the pole changer switches 176, 177, are adjusted to the left hand as shown, electric impulses of one polarity may be impressed upon the line wires L, M, from the battery 182, by operating the key 174, and when the switches are adjusted to the right hand impulses of opposite polarity may thus be impressed upon the telephone line. It will be remembered that like reverse impulses are automatically impressed upon the telephone line when the train despatcher operates a selector key of the class shown in above named United States Patent No. 1,105,766, and which stops itself after performing this important function.

The parts generally marked D, include a neutral relay wire coil 193 connected at one end to a wire 194, leading through supply wires 195, 196, to the negative pole of an energy source or battery 197. The other end of coil 193 is connected by wires 198, 232, to the HI contact 167, and from the junction of wires 198, 232, a wire 199 leads to a contact 200, to which the energized coil 193 attracts an armature 201, below which is a second armature 202, and a third armature 203. The three armatures are coupled to swing in unison and rise together when relay coil 193 is energized whereby the armature 202 is lifted to a contact 204, and armature 203 is raised to a contact 205 from which it may later fall to a contact 206 when coil 193 is deënergized. The signal circuit breaker is indicated as a lever 207, which at its fulcrum is connected by wires 208, 209, to a motor actuating the signal 210. By means of wires 211, 212 the circuit breaker 207 may be put in circuit with the respective coils 16, 17, surrounding the cores 18, 19, fixed to the respective pole pieces 6, 7, of the tri-polar magnet of the answer back mechanism. The signal circuit breaker 207 may be connected to the signal 210 in any suitable manner and for the sake of simplifying the drawing and description is herein shown as connected by a rod 275, to the signal 210, whereby an adjustment of the signal to horizontal position will positively move the circuit breaker to electrically connect wires 208, 212, as shown in full lines in Fig. 22, and a reverse adjustment of the signal to vertical position will positively move the circuit breaker to electrically connect wires 208, 211, as indicated by dotted lines. The stop relay generally marked E, comprise two magnet cores 213, 214, respectively surrounded by reversely wound wire coils 215, 216, which when in circuit energize said cores and attract a polarized armature 217, which has a rising stem adapted to make contact with either of two contacts 218, 219, to which hereinafter named circuit wires are connected. One end of the coil 216 is connected by a wire 220 to the contact 205 of the signal relay and the other end of coil 216 is connected by a wire 221 to one battery supply wire 196. One end of the coil 215 is connected by a wire 222 to the signal relay contact 206, and the other end of coil 215 is connected by a wire 223 to the wire 221 which connects with the supply wire 196. The fulcrum of oscillatory armature 217 is connected by a wire 224 to the other supply wire 225 of the battery 197, and from said wire 224, a wire 226 leads to the fulcrum of the signal relay armature 202, the opposed contact 204 of which is connected to the signal motor by a wire 227.

Assuming that the answer back mechanism, the signal 210, and the auxiliary devices are relatively adjusted as shown in Fig. 22, and that the train despatcher wishes to change the signal from horizontal position to vertical position, he will operate the switch and key devices at G, or a selector key, to impress upon the line wires L, M, from battery 182, the special electric impulses necessary to actuate the HI contacts at this particular station and thereby temporarily hold contact 166 to both contacts 167, 168. One circuit closed when actuating the HI contacts and herein termed the

*First circuit* is from positive battery 197, wires 225, 228, 229, 230, 231, HI contacts 166, 167, wires 232, 198, signal relay coil 193, and wires 194, 195, 196, back to negative battery 197. This first circuit by energizing coil 193 attracts all three armatures 201, 202, 203, to their contacts 200, 204, 205, and thereby makes a

*Second circuit* from positive battery 197, through wires 225, 228, 229, 230, 233, CL contacts 169, 170, wire 234, signal relay armature 201, contact 200, wires 199, 198, relay coil 193, and wires 194, 195, 196, to negative battery 197, resulting in sticking up all three armatures 201, 202, 203, and in holding them up after the HI contacts have opened, and in also making a

*Third circuit* from positive battery 197, wires 225, 224, 226, signal relay armature 202, contact 204, wire 227, through the signal motor and the wires 209, 235, 195, 196, to negative battery 197, and the motor then operates to turn the signal 210, from the horizontal position to the dotted vertical position where it is held by a suitable retaining mechanism and the signal circuit breaker 207, simultaneously moves from the contact of wire 212, into the dotted position and then touches the contact of wire 211. If the construction of the remote control device, of which the signal 210 is given as an example, is such that this remote control device assumes its operated position and moves the circuit breaker 207 into contact with the wire 211 before the HI contacts 166 and 168 open, there is established a

*Fourth circuit* from positive battery 197, wires 225, 228, 229, 230, 231, HI contacts 166, 168, wires 236, 237, tri-polar magnet coil 16, wire 211, signal circuit breaker 207, and wires 208, 235, 195, 196, to negative battery 197. This fourth circuit assures turning of answer wheel 84, clockwise for a distance of one tooth 140 or 141, and the circuit is automatically broken when the HI contacts open or cease operation. There also is made a

*Fifth circuit* from positive battery 197, wires 225, 228, 229, 238, contacts 130, 129, arm 102, post 105, wires 239, 240, two-limbed contact 27, binding post 31, wires 241, 237, tri-polar magnet coil 16, wire 211, signal circuit breaker 207, and wires 208, 235, 195, 196, to negative battery 197. The course of the

*Sixth circuit* is from positive battery 197, wires 225, 224, stop relay armature 217, contact 218, wires 242, 240, and thence as in fifth circuit through two-limbed contact 27, binding post 31, wires 241, 237, tri-polar magnet coil 16, wire 211, signal circuit breaker 207, and wires 208, 235, 195, 196 to negative battery 197. This sixth circuit causes a continuous clockwise rotation of the answer wheel 84 step by step to give a series of three-two clicks in the train despatcher's telephone receiver, thereby indicating to the train despatcher that the signal 210 has assumed its vertical position. After the answer back attest of adjustment of the signal 210 to vertical position is fully understood at his telephone by the train despatcher he should stop said attest which he does by operating through the medium of the switches 176, 177, and key 174, or an equivalent selector key, the ST group of selector contacts which makes a

*Seventh circuit* from positive battery 197, wires 225, 228, 229, 230, 243, ST contacts 172, 173, wire 244, signal relay armature 203, its contact 205, wire 220, selector relay magnet coil 216, and wires 221, 196, to negative battery 197. This circuit by energizing the stop relay coil 216 moves the armature 217 from contact 218 to the dotted position at contact 219, thus breaking the sixth branch circuit, but leaving the fifth circuit active to cause clockwise rotation of answer wheel 84, until said wheel is stopped automatically by the answer back mechanism itself, as hereinafter more fully explained.

A series of different electric circuits is involved in causing the movement of the signal 210, from vertical position to horizontal position and in giving reverse order "two-three" click answer back telephonic attests thereof and later automatically stopping the mechanism.

When the train despatcher wishes to return the signal 210 to its horizontal position, he operates the switch and key devices at G, or a selector key, to impress upon line wires L, M, from battery 182, the special electric impulses necessary to actuate the CL contacts and separate contact 169 from 170, and connect 169 to contact 171. When this is done the signal relay coil 193 is deënergized because of breaking of above named second armature stick circuit, which permits gravital dropping of all three armatures 201, 202, 203. The dropping of armature 202 breaks the third circuit, and as the signal is no longer electrically held at vertical position it at once gravitally returns to horizontal position. In so doing it moves the signal circuit breaker 207 back to its original full line position to again electrically connect wires 212, 208. The roller 98, is now in the answer wheel notch 90, while contact 129 is separated from contact 130, and contact 128, is held to 130 by riding of its connected roller 97, upon the inner edge of the answer wheel track 89. If the construction of the remote control device, as the signal 210, is such that the CL contacts 169 and 171 are closed after the signal 210 assumes its horizontal position to place the circuit breaker 207 in contact with the wire 212, there is made an

*Eighth circuit* from positive battery 197, wires 225, 228, 229, 230, 233, CL contacts 169, 171, wires 245, 246, tri-polar magnet coil 17, wire 212, signal circuit breaker 207, and wires 208, 235, 195, 196, to negative battery 197. This eighth circuit assures turning of answer wheel 84, counter-clockwise for a distance of one tooth and the circuit is broken when the CL contacts cease operation. There also is made a

*Ninth circuit* from positive battery 197, wires 225, 228, 229, 238, contacts 130, 128, arm 101, binding post 104, wire 247, two-limbed contact 28, binding post 32, wires 248, 246, coil 17, wire 212, signal circuit breaker 207, and wires 208, 235, 195, 196, to negative battery 197. The course of the

*Tenth circuit* is from positive battery 197, wires 225, 224, stop relay armature 217, contact 219, wire 249, post 104, wire 247, and thence as in ninth circuit through two-limbed contact 28, binding post 32, wires 248, 246, coil 17, wire 212, signal circuit breaker 207, and wires 208, 235, 195, 196, to negative battery 197. When the CL contacts 169 and 171 open, if the eighth circuit has been closed, the armature 55 and the control armature 13 are released and the tenth circuit causes a continuous step by step rotation of the answer wheel 84 in a counter-clockwise direction, thereby giving in the train despatcher's telephone receiver a series of two-three clicks which tell him that the signal 210 has properly returned to its horizontal position. After the first answer back attest of adjustment of the signal to horizontal position is fully understood at his telephone by the train despatcher he should stop said attest which he does by operating through the medium of the switches 176, 177, and key 174, or an equivalent selector key, the ST group of selector contacts which makes an

*Eleventh circuit* from positive battery 197, wires 225, 228, 229, 230, 243, ST contacts 172, 173, wire 244, signal relay armature 203, contact 206, wire 222, stop relay coil 215, and wires 223, 221, 196, to negative battery 197. This circuit by energizing coil 215 of the stop relay E, moves armature 217 back from the dotted position to the full line position at contact 218, thus breaking the tenth branch circuit, but leaving the ninth circuit active to cause counter-clockwise rotation of answer wheel 84 until said wheel is stopped automatically by the answer back mechanism itself, as hereinafter more fully described.

There are two additional circuits directly used in assuring the answer back attests of signal indications at the train despatcher's telephone and including a

*Twelfth circuit* from positive battery 197, wires 225, 228, 250, the primary winding 251, of an induction coil, wire 252, binding post 151, plate 149, its contact 147, contact 145 on plate 143, through plate 143, and its contact 144, to contact 146 on plate 148, through plate 148 to binding post 150, and thence by wire 253 to such portion of the battery 197, as shall assure passage of only so much of its energy as may be necessary for completing the answer back circuits without confusing the answer back click attests at the telephone which is connected in a secondary

*Thirteenth circuit.* induced by making and breaking the twelfth circuit and running from the secondary winding 254 of the induction coil, through wire 252, binding post 151, plate 149, contacts 147, 145, plate 143, arm 136, its fulcrum post 134, wires 255, 256, 257, to telephone line wire L, and thence by wires 185, 189, to the telephone receiver 175, and by wires 190, 188, to the other line wire M, and thence through wires 258, 259, 260, binding post 158, plate 157, contacts 156, 155, plate 153, binding post 154, wire 261, condenser 262 and wire 263 back to the secondary induction coil 254. The selector circuit wires 163, 164, are connected to the answer back circuit wires 259, 256, at points behind the lightning arrester N, and thus safely provide current from the line wires L, M, for energizing the selector armature operating coils 161, 162, for operating the three groups of selector contacts. It should be noted that when the arm 136 carrying the roller 139 is in its upper position, as shown in Fig. 22, both terminals of the battery 197 are disconnected from the line wires L and M, and that both terminals of the secondary 254 of the induction coil are also disconnected from said line wires. It is desirable to disconnect the battery 197 from the line wires L and M in order that current applied at the central station to the line wires L and M to operate the selector F will not be deflected from the coils of the selector through the battery 197. A like advantage is obtained by disconnecting the secondary 254 of the induction coil from the line wires L and M; and the further advantage of protecting said secondary against lightning discharges is obtained. These advantages are obtained in a simple and reliable manner by the use of only three pairs of contacts.

In view of the above detailed description of the answer back mechanism and of its general arrangement relatively to the signal C and its controlling relay D, the stop relay E, the selector contacts F, the train despatcher's equipment G, and the employed electric circuits, a comparatively brief explanation of the complete operations will suffice, it being assumed that all parts are relatively adjusted as shown in full lines in the drawings, with the signal at C set to normal horizontal position.

Should the train despatcher wish to set this signal to vertical position, say at a track siding where there is no human agent or operator, he will impress upon the line wires L, M, the electric impulses necessary to briefly actuate the HI group of selector contacts. The first circuit energizes the signal relay coil 193, and attracts armatures 201, 202, 203, to their opposed contacts 200, 204, 205. The second circuit sticks up these armatures. The third circuit causes movement of the signal 210 from horizontal position to vertical position. In case the remote control device, as the signal 210, is so constructed that it assumes its operated condition before the HI contacts 167, 168 separate, the fourth circuit is established; and this fourth circuit by primarily energizing the magnet coil 16 of the answer back mechanism attracts the opposing end of primary armature plate 55, toward magnet core 18, thereby swinging the armature arm 56 to the right and causing the pawl 82 to turn the toothed answer wheel 84, clockwise in direction of arrow r, in Figs. 1 and 22, of the drawings, for a distance of one tooth where said wheel is electrically locked by the attracted armature and its pawl 82, until after cessation of operation of the HI contacts to specially assure that the three-two click answer back attest to be later given by further clock-wise rotation of wheel 84, shall not be confused at the train despatcher's telephone by noises incident to operation of said HI contacts. The fourth circuit thus has the additional and important function of temporarily locking the answer wheel to assure clear answer back attests at the telephone, providing that the conditions are as before described, namely, that the construction of the remote control device, such as signal 210, permits this remote control device to assume its operated position before the HI contacts 166 and 168 open, so that even if the impedance coils 191 and 192 are so proportioned and adjusted that they subdue or muffle the click sounds incident to the operation of the key 174 or the equivalent calling key, the fourth circuit prevents any interference with the answer back attests. After the HI contacts cease to operate and the fourth circuit through the wire 236 is consequently broken at contacts 166, 168, with resultant unlocking of the armature 55, the further clockwise rotation of answer wheel 84 is transferred to or controlled by the sixth circuit. As the energizing of coil 16 had caused the above named right hand tilt of the primary armature 55, the coil had simultaneously magnetized the pole piece 6, which at once attracted the upper end of segmental armature 13 to the left in direction of arrow x in Figs. 9 and 19, thereby swinging the attached pendent control 25 to the left, as viewed in Fig. 11 until it strikes the elastic plate contact 27 and forces its lower limbs from the contacts 50, 51, of the binding post 31, thus momentarily breaking said fifth and sixth circuits and de-energizing coil 16, and the now unattracted armature 13 at once gravitally swings back to normal neutral position while the also unattracted armature 55 quickly tilts back to normal neutral position aided by upward pressure of the finger 75 of the rocking spring pressed balancing device, thereby allowing the head of pawl 82 to gravitally engage behind the next left hand tooth 140, or 141, of answer wheel 84. As the retreating control 25 leaves the contact 27, said contact again touches the contacts of binding post 31, and thus remakes the fifth and sixth circuits, thereby again energizing the coil 16 to cause attraction of armatures 13 and 55, and move the pawl 82 to turn the answer wheel clockwise the distance of another tooth, and as the attracted armature 13 again swings the control 25 to the right hand said control again moves the contact 27 from the binding post 31, to again momentarily break the fifth and sixth circuits and allow prompt return of both armatures to neutral positions, whereby the circuits are again completed by moving of contact 27, to binding post 31, to again energize the coil 16; and thus may said coil be automatically energized and deënergized under influence of said electric circuits and the gravitating armatures to assure automatic continuous tooth-by-tooth rotation of the answer wheel 84, clockwise until it is stopped, as hereinafter explained.

In this connection it should be noted that the armature 13, after its upper end has been tilted to the left in the direction indicated by arow $x$ in Fig. 19, continues its tilting movement for a slight distance after the circuit for the coil 16 is broken, due to the momentum of said armature, and that when the armature 13 swings back by gravity in the direction indicated by the arrow $y$ in Fig. 19, it is carried a slight distance beyond its middle position because of its momentum, so that, although the circuit through the coil 16 is reëstablished as soon as the armature 13 nearly reaches its middle position, the movement of the armature 13 is not, however, instantly arrested and the attraction of the coil 16 does not instantly swing the armature back to the left. By proportioning the weight of the armature and the location of its center of gravity with reference to its axis of oscillation, a certain period of oscillation for the armature 13 may be obtained; and this period is determined so that during the time between the making of the circuit through the coil 16, the breaking thereof and the subsequent remaking of this circuit, the armature 55 may be attracted by the coil 16 and advance the answer wheel 84 positively one tooth, and the armature 55 may return to its middle position and the pawl 82 positively engage the next tooth of the answer wheel. It is obvious that the inertia of the answer wheel 84, the pawls and the other parts associated with the armature 55 make it impractical to positively advance the answer wheel step by step by very quickly making and breaking the circuit for the coil 16 without requiring excessive current and without making the answer back impulse given by the answer wheel too brief to be readily distinguished; and the control armature 13, which in many respects is similar in its action to that of the well known pendulum, constitutes a simple and reliable device for making and breaking the circuit through the coil 16 slowly enough to permit the armature 55 to positively advance the answer wheel 84. It should be noted that while the armature 55 and the control armature 13 are mechanically independent, they are actuated simply and efficiently by one pair of coils. The particular construction shown and described for making and breaking the circuit through the coil 16 has an additional advantage due to its pendulum action, that, within certain limits, the strength of the coil 16 does not affect the period of oscillation of the armature 13 and the consequent timing of the making and breaking of this circuit; and for practical purposes this period of oscillation is substantially the same although the current flowing through the coil 16 may decrease, as for instance, due to the depreciation or weakening of the battery 197.

As each long tooth 140, of wheel 84 passes the roller 139, it depresses it, thereby closing the above named twelfth and thirteenth circuits and assuring a distinct click sound at the train despatcher's telephone 175, hence as each three-two group of teeth 140 passes the roller 139, a corresponding three-two click answer back attest of adjustment of the signal from horizontal to the vertical position was given at the telephone and thereby the train despatcher knows that the distant signal was adjusted as he intended and should stop an oncoming train. When said train approaches the signal it stops to allow the train crew to use a conveniently placed telephone to receive orders from the train despatcher. If his order be to take the siding to permit a following train to pass, the trainmen will properly set the switch and after the train takes the siding the switch will be readjusted to allow the following train to pass safely after the signal had been automatically returned to the horizontal position by the train despatcher operating the CL group of contacts, as hereinafter more fully explained.

Since the signal 210 is now in its vertical position, the ninth circuit is broken at the circuit breaker 207, and the movement of contact 128 to the contact 130 is merely an inert engagement which cannot close the ninth circuit and thus does not operatively affect the answer back mechanism while the answer wheel 84 is turning clockwise under influence of the intermittently energized and deënergized magnet coil 16. As the wheel 84 continues clockwise rotation, both rollers 97, 98, ride upon the inner edge of the wheel track 89, and both contacts 128, 129 engage the central common contact 130, the contact 128, inertly as above explained and the contact 129, actively to close the fifth circuit through the magnet coil 16. During clockwise turning of the answer wheel two-thirds around, or until the wheel notch 90 opposes the roller 98, two distinctive three-two answer back clicks will be audible at the train despatcher's telephone. As the roller 98, is pressed into the wheel notch 90, by the action of spring 106, on the roller carrying arm 102, the fifth circuit would be temporarily broken by separation of contacts 129, 130, but as the sixth circuit through the selector relay armature 217 and the contact 218 remains unbroken, said sixth circuit alone will urge the answer wheel around further clockwise. As the wheel notch 90 passes the other roller 97, said roller will simply enter and leave the notch and cause temporary disengagement of contacts 128, 130, and again inertly engage said contacts. It is obvious that the above intermittent energization of the coil 16 by the fifth and sixth circuits would indefinitely continue clockwise rotation of the answer wheel 84 and give like continuous answer back attests at the telephone until stopped by the train despatcher impressing upon the line wires by his selector key the electric impulses necessary to actuate the ST group of selector contacts. As hereinbefore stated this establishes the seventh circuit resulting in moving the selector relay armature 217 from contact 218, to contact 219, thus breaking the sixth branch circuit but leaving the fifth circuit active to alone cause further clockclose rotation of wheel 84 to any extent necessary to carry its notch 90, directly under the roller 98, into which said roller then is pressed by the arm 102, thereby separating the contacts 129, 130, and finally breaking the fifth circuit and stopping the answer wheel and consequently stopping the answer back telephonic attest of signal adjustment to the vertical position which had been given by the long wheel teeth 140, depressing the roller 139 intermittently to close the twelfth and thirteenth circuits which now are definitely broken. One purpose of the fifth circuit and the reason for controlling it by the contacts 128 and 130 is to assure that the answer wheel when it finally stops will be in such position that the next movement of the answer wheel in either direction will give the proper sequence of impulses. To illustrate, it can be seen that unless the fifth circuit is used there is no reason why the answer wheel 84 should stop at any particular point when the operator causes the closing of the ST contacts and the movement of the armature 217 of the stop relay E to its opposite position; and it might well happen, unless the fifth circuit or a similar means is provided, that the answer wheel 84 would stop with the roller 139 on the arm 136 between any two of the teeth around the periphery of said answer wheel, with the result that the first series of impulses would be incorrect.

In the practical operation of the answer back mechanism, it is found that the first one or two series of answer back clicks are ordinarily so clearly given in the train despatcher's telephone receiver that further repetition of these answer back clicks is unnecessary; and if the train despatcher wishes to save time and use the line as soon as possible for receiving an answer back attest of the operation of another signal, he may control the answer back mechanism so that the answer wheel will make only two-thirds of a revolution after it has first started, that is, for instance, the answer wheel will move from the position shown in Fig. 22 to the position in which the roller 98 is in the notch 90 and will then stop. To so limit the movement of the answer wheel 84 to two-thirds of a revolution, the train despatcher causes an operation of the ST contacts and the shifting of the armature 217 of the stop relay E before the answer wheel has made two-thirds of the revolution; and he may cause this early operation of the ST contacts by setting the calling key governing said ST contacts into operation as soon as he has received and understood the first series of answer back clicks, since the time required to operate the selector F and the stop relay E is ordinarily short as compared with the time required to move the answer wheel 84 step by step one-third of a revolution. Moreover, if necessary, the train despatcher may anticipate the completion of the first or second series of answer back clicks by causing the operation of the ST contacts immediately after the operation of the CL contacts or the HI contacts is ended, the impedance coils 191 and 192 in this case serving to prevent the answer back clicks being confused by the noises incident to the operation of the ST contacts. For this reason it may be said that in the ordinary practical operation of the answer back mechanism the answer wheel 84 ordinarily makes only two-thirds of a revolution. During this wheel stopping operation the roller detent 124, on the primary armature arm 56, by pressing on the rigid finger 127 during the last right hand tilting of the armature assures two important advantages by temporarily delaying entrance of the roller into the wheel notch 90 until the center of the roller is about opposite the center of the notch thus permitting the roller to at once fully enter the notch instead of riding into it gradually from the inner edge of the wheel track 89. Experiments proved that when the roller 98, thus gradually entered the wheel notch 90, the wheel rotating fifth circuit while being broken was so influenced that the answer back mechanism just prior to stopping operated with a very undesirable flutter or tremor which was fully obviated by the prompt full engagement of the roller 98 with the notch 90. Without the roller detent 124, the contact 129 might break contact with the contact 130 before the roller 98 had fully entered the notch 90 in the inner periphery of the answer wheel 84, and it would be possible for the answer wheel 84 to be left in such position that, if the contacts 129 and 130 were subsequently closed by jar or vibration, the answer wheel would be moved two teeth so as to carry the roller 98 past the notch 90 and commence another revolution of the answer wheel. The detent roller 124, however, obviates this possible difficulty and makes it certain that when the fifth circuit is broken and the answer wheel finally stops, the roller 98 will rest squarely in the notch 90 from which said roller cannot be displaced by ordinary jar and vibration. The second advantage is that the somewhat delicate flexible active contact 129 is held to the contact 130 for an instant while the fifth circuit is for the last time broken at the rear contact 27 and post 31, by the control 25 during the last right hand tilting movement of the primary armature, whereby the fifth circuit is broken at said contacts 27, 31, and not at the contacts 129, 130, thus preventing destructive sparking at said contacts 129, 130, which normally separate for only a short distance. This compulsory breaking of the circuit only at the rear contacts 27, 31, gives special importance to the two-limbed form of contact 27, relatively to the pitting and non-pitting qualities of the respective smaller and larger rings or blocks 51, 50 of the binding post contact 31, which minimize sparking at the two-limbed contact 27. Said contact 27, thus is itself directly guarded against destructive sparking while it indirectly and fully guards the delicate arm contact 129, by taking all shock incident to breaking of the fifth circuit. The same functions and advantages above described for the detent roller 124 in connection with the contact 129 on the arm 102, are also true in connection with the contact 128 on the arm 101.

Should the same or a succeeding train despatcher for any reason wish to obtain a later verifying attest of adjustment of the signal to vertical position he may do this by simply causing operation of the HI contacts. Since the signal 210 is now in its vertical position, and the circuit breaker 207 is in its dotted line position and in contact with the wire 211, the closing of the HI contacts 166 and 168 establishes the fourth circuit, which energizes the coil 16 and moves the answer wheel 84 one tooth clockwise. At this time the roller 98 is in the notch 90 in the answer wheel 84, since the previous clockwise movement of said answer wheel was stopped, as hereinbefore explained, when the roller 98 dropped in said notch 90; but the movement of the answer wheel 84 one tooth clockwise by the closing of the fourth circuit draws the roller 98 out of the notch 90 and presses the contact arm 102 inward to bring the contacts 129 and 130 together, thereby closing the only break in the fifth circuit, so that when the HI contacts 166 and 168 open, the armature 55 and the control armature 13 are released, and step by step movement of the answer wheel 84 in a clockwise direction is produced by the fifth circuit. The stop relay E is not affected by the operation of the HI contacts and remains in the dotted line position to which it was previously moved so that the sixth circuit is broken. Consequently, when the answer wheel 84 has made one complete revolution to bring the notch 90 therein opposite to the roller 98, the dropping of this roller into said notch by breaking the fifth circuit interrupts the only circuit which is effective at that time to operate the answer wheel, whereupon said answer wheel comes to a stop. This one clockwise revolution of wheel 84 gives three verifying three-two click answer back attests at the telephone to assure the train despatcher that the signal 210 is correctly set in the vertical position. If this one triple verifying attest be insufficient the HI contacts may again be operated to likewise cause another complete clockwise revolution of the answer wheel and thus assure another triple verifying three-two answer back click attest at the telephone. These verifying attests are obtainable independently of operation of the signal which meanwhile had not changed from its vertical position because the now active second signal relay armature stick circuit made through the unoperated CL contacts keeps said relay energized and the third circuit closed and thereby electrically holds or locks the signal at vertical position until this stick circuit is later broken by operating the CL contacts. When the train despatcher closes the CL contacts, the second circuit is broken and the signal relay coil 193 is deënergized, causing the armatures 201, 202, 203, to drop, thereby interrupting the third circuit and as electric locking of the signal in the vertical position has ceased, the signal gravitally drops to the horizontal position shown in full lines, and the circuit breaker 207 moves to again electrically connect wires 208, 212. As the relative operations of parts of the answer back mechanism when turning the wheel counter-clockwise are practically a reversal of the above described operations during clockwise turning of the wheel, a quite brief further description will suffice.

If the signal 210 operates quickly enough, the eighth circuit is closed while the CL contacts 169 and 171 are closed, and the coil 17 is energized and its core 19, and the pole piece 7 are magnetized. The core attracts the primary armature the arm 56 of which tilts to the left hand and moves pawl 83 likewise to turn the answer wheel 84 counter-clockwise in direction of arrow 1, in Figs. 1 and 22, for a distance of one tooth and the wheel then is electrically locked until after the CL contacts open to break the eighth circuit. Thus locking the wheel prevents confusion of later given two-three click answer back attests at the train despatcher's telephone by the opening of the CL contacts 169 and 171. The control armature 13 is attracted by pole piece 7 to the right in direction of arrow $y$, in Figs. 9 and 22, and swings the control 25 over to the left until it separates the two-limbed contact 28, from the binding post 32, and thus momentarily breaks the ninth and tenth circuits and when the eighth circuit is broken, assuming it has been made, both armatures 55 and 13, promptly resume normal neutral positions, the retraction of armature 55, being assured by upward pressure of the finger 76 of the subjacent spring-pressed balancing device. As these neutral armature positions are taken the ninth and tenth circuits again become active, through contacts 28, 32, to again actuate the pawl 83 and turn wheel 84 the distance of another tooth, and thus the alternate energizing and deënergizing of coil 17, and the gravitating armatures, causes continuous tooth-by-tooth counter-clockwise rotation of the answer wheel while the rollers 98, 97, leave and enter the wheel notch 90, and their respective contacts 129, 128, touch and leave the common contact 130, but now all engagements of contact 128 with 130 will be active for passing current to actuate the answer back mechanism, and all engagements of contact 129 with 130 will be inert and without effect on the mechanism. As the unlocked wheel 84, turns counter-clockwise its long teeth 140 depress the roller 139, and its arm 136, thereby intermittently closing the twelfth and thirteenth circuits and assuring at the train despatcher's telephone the reverse two-three answer back clicks in attest of change of the signal 210 from vertical to horizontal position. This attest will continue until the train despatcher actuates the ST contacts. This being done the stop relay coil 215 is energized to again attract armature 217 to contact 218, thus breaking the tenth circuit but leaving the ninth active to alone rotate the answer wheel until the roller 97 enters the wheel notch 90, thereby separating contacts 128, 130, and breaking this ninth circuit whereupon the answer wheel stops and consequently the two-three click answer back attest also stops. As the answer wheel 84 turned counter-clockwise, the primary armature detent 124 coacted with the rigid finger 126, to delay entrance of roller 97, into the wheel notch 90, until said roller was fully opposite the notch, thus preventing tremulous action of the answer back mechanism and also avoiding destructive sparking at the delicate contact 128, by assuring breaking of the ninth circuit only at the rear contacts 28, 32, substantially as above described relatively to similar coacting parts during clockwise rotation of the answer wheel.

Should the train despatcher wish to have a verifying attest of adjustment of the signal to horizontal position he may obtain this by simply causing operation of the CL contacts, thereby again closing the eighth and ninth circuits to again rotate the answer wheel. As the ST contacts are not now operated and the position of the stop relay armature 217 consequently remains unchanged, the answer wheel is turned in the same counter-clockwise direction by reenergization of the tri-polar magnet coil 17, and while contact 128, is active and contact 129 is inert at the post 130. The wheel now makes only one complete counter-clockwise revolution and stops when the roller 97 again drops into the wheel notch 90, and thus opens contacts 128, 130 to break the ninth circuit. This one counter-clockwise revolution of wheel 84, gives three verifying two-three click answer back attests at the telephone to assure the train despatcher that the signal 210 is correctly set in the horizontal position. If this one triple verifying attest be insufficient the CL contacts may again be operated to likewise cause another full counter-clockwise revolution of the answer wheel and thus assure another triple verifying two-three click answer back attest at the telephone. These verifying attests also are obtainable independently of operation of the signal which meanwhile had not changed from its horizontal position.

After a train despatcher has set a signal, as the signal 210, at a distant point to its operated or vertical position, and has received an answer back indication telling him that the signal has properly operated to its vertical position, it may happen that this signal, because of a break or failure of some of its operating parts, or for some other reason, will return to its biased position; and it is desirable that the train despatcher should be informed of this change in the position of the signal. This result is accomplished automatically by the operation of the devices and controlling circuits embodying this invention shown and hereinbefore described, and constitutes an important feature of the invention, since in using this invention embodying this feature, the train despatcher may be assured not only that each signal which he has operated from the central station has at the time of the operation assumed its proper position, but also that this signal has not for any reason changed its position since it was last operated. To illustrate the way in which the parts and controlling circuits shown and hereinbefore described accomplish this desirable result, referring to Fig. 22, assume that the signal 210 has been operated to its vertical or operated position, that the answer back, indicating that said signal has assumed its operated position, has been received and understood by the train despatcher, and has been discontinued by him; and further assume that at some time thereafter the signal 210 improperly returns to its biased horizontal position for some reason. Under the conditions assumed before the signal 210 abnormally moves to its biased or stop position the circuit breaker 207 will be in its vertical position, opposite to that shown in Fig. 22; the signal relay 193 will be energized and its three armatures will be in their upper position; and the armature 217 of the stop relay E will be in its left hand or dotted position. With the armature 217 of the stop relay E in the position just described, it can be seen that the tenth circuit is complete at all points except at the circuit breaker 207; and consequently when the signal 210 improperly moves to its biased or horizontal position, the circuit breaker 207 closes the tenth circuit thereby commencing a continuous counter-clockwise rotation of the answer wheel 84 in the direction indicated by the arrow $l$ in Fig. 22, with the result that a persistent code indication of repeated two-three clicks is given in the train despatcher's telephone receiver. As explained hereinbefore, the tenth circuit rotates the answer wheel 84 continuously in a counter-clockwise direction until the train despatcher causes an operation of the ST contacts; and consequently, regardless of whether or not the train despatcher is at his desk at the time the signal 210 changes its position abnormally or whether or not the train despatcher is engaged in operating other signals, the fact that the signal 210 has operated abnormally will be persistently indicated at the central station until it is recognized. The signal relay 193 is energized at the time the signal 210 makes its abnormal movement, and the armature 203 of this relay 193, being in its upper position, interrupts the eleventh circuit by means of which the coil 215 of the stop relay E is energized and the armature 217 of said stop relay shifted from its dotted line position to its full line position to interrupt the tenth circuit. Hence, in order that the eleventh circuit for discontinuing the continuous counter-clockwise rotation of the answer wheel 84 produced by the tenth circuit may be made, it is necessary for the train despatcher to cause an operation of the CL contacts and deënergize the signal relay 193 by breaking the second circuit. In other words, when the indication of an abnormal movement of the signal 210 is received at the central station, as explained above, before the train despatcher can stop this indication by causing an operation of the ST contacts, he must first manipulate the calling key which would cause the signal 210 to assume a position corresponding to the position which the signal has taken.

From the foregoing it can be seen that any abnormal movement of any signal along the railroad causes a persistent indication at the central station, which can be stopped only after the calling keys controlling that signal have been changed to correspond with the position which the signal has taken. In a similar way a persistent indication is given at the central station in case a signal in its horizontal or biased position should falsely move to its vertical or operated position for any reason, as for instance, because of stray current.

In Fig. 22, are indicated two electric lamps 264, 265, with respective batteries 266, 267, furnishing current to light them. One pole of battery 266 is connected by a wire 268 to the fixed end of the rear two-limbed contact 29, the free ends of which normally touch the rear binding post 33, which is connected by a wire 269, to one terminal of the lamp 264, the other terminal of which connects by a wire 270, to the other pole of battery 266. A wire 271, connects one pole of battery 267, to the fixed end of the opposite rear two-limbed contact 30, the free ends of which, normally touch the other rear binding post 34, which is connected by a wire 272, to one terminal of the lamp 265, the other terminal of which is connected by a wire 273, to the other pole of battery 267. By the above named electric circuits including the batteries 266, 267, the lights 264, 265, may respectively be flashed as the closed circuits are broken at binding posts 33, 34, by the rear control 26 of armature 13, during clockwise and counter-clockwise rotation of the answer wheel 84.

The two rear sets of contacts 29—33 and 30—34, may be used for other purpose than flashing lights, and there may be more than two additional sets of contacts operative by the control armature 13 during rotative movements of the answer wheel 84, for controlling electric circuits including other lamps or devices. The front contact 112 controlled by the roller 111 on the finger 110 of the roller carrying arm 101, may through wires 274, 275, coupled to respective binding posts 113, 118, be made to make and break circuits for electrically operating other lamps or devices under control of the rotating answer wheel 84, and like results may follow operation of the other front contact 116 actuated by the roller 115 on the finger 114 of the other roller carrying arm 102, under control of the answer wheel, and by means of circuits operating through wires 276, 277, respectively coupled to the two binding posts 117, 119.

In the practical development of this invention one object was to promote inexpensive construction and durability in use by causing the smallest number of coacting parts to perform the largest number of desirable functions. It is already seen that the same functions may be performed by a larger number of parts having different relative arrangement, and that differently formed but substantially equivalent coacting parts may be made to operate with substantially similar results under influence of either open or closed electric circuits, and that answer back mechanisms embodying one or more of the novel principles of the invention may be operated otherwise than electrically. It, therefore, follows that there may be various modifications of the invention capable of performing some or all of its functions and lying fairly within the scope of one or more of the appended claims.

Although I have particularly described the construction of one physical embodiment of my invention, and explained the operation and principle thereof; nevertheless, I desire to have it understood that the form selected is merely illustrative, but does not exhaust the possible physical embodiments of the idea of means underlying my invention.

What I claim as new and desire to secure by Letters Patent of the United States, is:

1. In a signaling system, in combination: a remote control device capable of assuming different operated conditions; separate circuit controlling means selectively controlled from a central station for causing said device to assume a particular condition; and answer back means governed by said device and said circuit controlling means for sending a code indication to said central station which will correspond to the particular condition of the remote control device and the circuit controlling means operated.

2. In a signaling system, in combination: a remote control device capable of assuming different operated conditions; means governed by said device for giving at a distant point persistent code indications which have different characteristics according to the operated condition of said device; and means controlled from said distant point for discontinuing said indication at the end of a code.

3. In a signaling system, in combination: a remote control device capable of assuming different operated conditions; means for selectively controlling said device from a central station to cause it to change from either of its operated conditions to the other; answer back mechanism governed by said remote control device for automatically giving at the central station persistent code indications of different characteristics according to the operated condition of said device; and other means selectively controlled from the central station for discontinuing said indications.

4. In a signaling system, in combination: a remote control device capable of assuming different operated conditions; means for selectively controlling said device from a central station; answer back mechanism governed by said remote control device for automatically giving at said central station persistent and distinctive code indications each time said device changes from one of said operated conditions to another; and means selectively controlled from said central station for discontinuing said indications at the end of a code.

5. In a signaling system, in combination: a line circuit; a signal having two indicating positions; a selector controlled over the line circuit and having contacts for governing said signal; a circuit governed by said signal in one of said indicating positions; a second circuit governed by said signal in the other of said indicating positions; answer back means selectively governed by each of said circuits for sending persistent code indications over said line circuit which are distinctive according to the position of said signal; a local source of energy for supplying current to operate said signal and said answer back means; and means controlled by separate contacts of the selector for alternately making and breaking said circuits and thereby stopping one code indication and setting up conditions for the transmission of the other code indication when the signal changes its position.

6. In a signaling system, in combination: a remote control device capable of assuming different operated conditions; means for governing said device from a distant point; electromagnetic means governed by said device for giving at said distant point persistent code indications which have different characteristics according to the operated condition of said device; and means governed from said distant point for discontinuing the operation of said electromagnetic means at a predetermined point in its operation.

7. In an answer back signal system, the combination with a power operated signal capable of assuming either of two different positions, answer back mechanism comprising an answer wheel having equally spaced teeth with some longer than others, the long teeth being arranged in a code, means including pawls and two coils for rotating the answer wheel step by step in either direction, an energizing circuit for each coil, circuit controlling means operated by the signal for selectively controlling said circuits, and other means for making and breaking said circuits alternately.

8. In a signal system, in combination: a line circuit; a selector having two circuit controlling devices selectively controlled over the line circuit from a central station; a signal governed by said selector and capable of assuming two different positions; answer back mechanism capable of sending two distinctive indications over the line circuit to the central station; and means dependent on the operation of either circuit controlling device and also upon the signal being in the corresponding position for causing said answer back mechanism to send the corresponding indication.

9. In a signal system, in combination: a line circuit; a selector having two circuit controlling devices selectively controlled over the line circuit from a central station; a signal selectively governed by said selector capable of assuming two different positions; answer back mechanism capable of sending persistently two distinctive indications over the line circuit to the central station; means dependent on the operation of either circuit controlling device and also upon the signal being in the corresponding position for causing said answer back mechanism to send the corresponding indication; and means selectively controlled from said central station for discontinuing said persistent indication.

10. In a signaling system, in combination: a plurality of remote control devices; means for governing said devices selectively from a central station; an answer back mechanism associated with each device and governed thereby for sending to said central station a persistently repeated code indication of the operated condition of the corresponding device, said code indications of the respective answer back mechanisms being different; and means controlled from said central station for discontinuing the indications given by any one of said answer back mechanisms at the end of a code.

11. In a signaling system, in combination: a plurality of remote control devices each capable of assuming different operated conditions; means for selectively governing said devices from a central station; an answer back mechanism associated with each of said devices and governed thereby for sending to said central station persistent code indications of the operated condition of its corresponding device, said indications having different characteristics for each device and being distinctive for each position of said device; and means selectively controlled from said central station for discontinuing any one of said answer back mechanisms at the end of a code.

12. In a signaling system, in combination: a remote control device capable of assuming different operated conditions; and means controlled from a distant point for giving at said distant point an indication of the operated condition of said device existing at that time and without changing such condition.

13. In a signaling system, in combination: a remote control device capable of assuming different operated conditions; and means governed by said device and adapted to be set into operation from a distant point for giving to said distant point for a limited time indications of the operated condition of said device existing at that time and without changing said condition.

14. In an answer back signaling system for railroads having a sending station, a way station, and a line circuit connecting said stations, a selector at the way station controlled over the line circuit from the sending station and having sets of contacts operated selectively, a power operated signal at the way station, a stick relay controlling said signal and having its pickup and stick circuits controlled by separate sets of contacts on the selector, answer back mechanism at the way station responsive to the position of the signal and adapted to send either of two code signals over the line circuit to the sending station which are characteristic of the existing position of the signal and which persist until stopped, a stop relay for stopping the operation of said mechanism, and two circuits for controlling the stop relay, both including a set of contacts on the selector and selectively governed by said stick relay.

15. In a signaling system, in combination: a remote control device capable of assuming different operated conditions; means governed by said device for giving at a distant point a persistent code indication of the operated condition of said device; means controlled from said distant point for discontinuing said indication at the end of a code; and means controlled from said distant point for rendering said first mentioned means effective to repeat said indication for a limited period.

16. In a signaling system, in combination: a remote control device capable of assuming different operated conditions; answer back mechanism governed by said device for indicating at a distant point the operated condition of said device; and means controlled from said distant point for setting said answer back mechanism into operation without changing said operated condition of said device.

17. In a signaling system, in combination: a plurality of remote control devices each capable of assuming different operated conditions; a central station; selectors controlled from said central station for selectively governing said devices; answer back mechanism associated with each device and governed thereby for indicating at said central station the operated condition of the corresponding device; and means associated with each answer back mechanism and controlled by the corresponding selector for causing said answer back mechanism to give its indications for a limited period.

18. In a signaling system, in combination: a remote control device; a selector associated with said remote control device; answer back mechanism governed by said device; and means governed by said selector for governing the operation of said remote control device and for independently governing the operation of said answer back mechanism.

19. In a signaling system, in combination: a remote control device capable of assuming different operated conditions; a selector governed from a distant point for controlling said device; answer back mechanism for giving at said distant point an indication of the operated condition of said device; and means governed by said selector for setting said answer back mechanism into operation without changing the operated condition of the remote control device.

20. In a selective signaling system, a sending station, a waystation, selectively operated circuit controlling means at said waystation, a signal at said waystation, a circuit therefor controlled by said selectively operated means for moving said signal into set or clear position, answer back mechanism at the waystation adapted upon operation of said selectively operated means to transmit to the despatcher a characteristic signal denoting the condition of said signal, and means controlled by said selectively operated means for causing a subsequent operation of said answer back means after the operation of said signal without changing the condition of said signal.

21. In a selective signaling system, a sending station, a waystation, selectively operated circuit controlling means at the waystation, a signal at said waystation, a circuit therefor controlled by said selectively operated means for causing said signal to move to set or clear position, answer back operating means, means controlled by said selectively operated means for causing the operation of said answer back means when said signal is moved into set or clear position, and means whereby a subsequent operation of said selectively operated means may be made to cause the operation of said answer back mechanism without affecting the position of said signal.

22. In a selective signaling system, a sending station, a waystation, selectively operated circuit controlling means at the waystation, a semaphore signal at said waystation, a circuit for said semaphore signal, switching means controlled by the operation of said selectively operated means for determining the position of said semaphore signal, answer back means, a circuit therefor controlled by said switching means and means whereby said answer back means may be caused to operate upon a subsequent operation of the selectively operated means without affecting the position of said semaphore signal.

23. In a signaling system, in combination; a remote control device capable of assuming different operated conditions; answer back mechanism controlled by said device for giving at a distant point an indication of the operated condition of said device; and means governed from said distant point for setting said answer back mechanism into operation without changing the operated condition of said device, said answer back mechanism being automatically restored after each operation of said last mentioned means to its previously existing condition, whereby an indication of the existing operated condition of said device may be obtained any number of times without changing said operated condition.

24. In a signaling system, in combinaton: a remote control device capable of assuming different operated conditions; line wires; means for controlling said device over said line wires from a distant point; answer back means for sending over said line wires to said distant point code impulses indicating the operated condition of said remote control device; electromagnetic means for operating said answer back means; a controlling circuit for said electromagnetic means governed by said remote control device, whereby an indication is received at said distant point upon the operation of said remote control device; and another controlling circuit for said electromagnetic means governed from said distant point, whereby an indication of said operated condition of said remote control device may be obtained at said distant point any number of times without changing the existing operated condition of said remote control device.

25. In a signaling system, in combination: a remote control device capable of assuming different operated conditions; a selector for governing said device; means for controlling said selector from a distant point; answer back mechanism controlled by said device for giving at said distant point a persistent code indication of the operated condition of said device; and means controlled by said selector for discontinuing said indication at the end of a code.

26. In an answerback signaling system, the combination with a signal adapted to give either of two different indications, two circuits for controlling said signal, a selector having separate contacts selectively governing said circuits, answerback mechanism for producing code impulses characteristic of the signal and differing according to the indication given thereby, two operating circuits for said answerback mechanism, a circuit controller operated in accordance with the indication of the signal and selectively governing said operating circuits, and means including additional contacts on the selector for also controlling said operating circuits so as to stop the operation of the answerback mechanism.

27. In a signaling system, in combination: a remote control device capable of assuming different operated conditions; a selector for governing said remote control device; means for governing said selector from a central station; answer back mechanism controlled by said device for giving at said central station a code indication characteristic of that remote control device and differing according to the operated condition of that device; and other means selectively controlled by said selector for governing said answer back mechanism to give a verification of the indication last given.

28. In a signaling system, in combination: a plurality of remote control devices each capable of assuming different operated conditions; line wires; a selector associated with each remote control device and bridged across said line wires; means at a central station for selectively controlling said selectors; answer back mechanism associated with each remote control device for sending to said central station code indications characteristic of that remote control device and differing according to the operated condition of that device; means governed by said remote control device for controlling the corresponding answer back mechanism; and means controlled by each selector for selectively governing the corresponding answer back mechanism to give a verification at the central station of the indication last given.

29. A remote control device capable of assuming different operated conditions; line wires; a selector bridged across said line wires; means at the central station for governing said selector; means controlled by said selector for governing said remote control device; an answer wheel for sending code impulses over said line wires to said central station, said code impulses given by said answer wheel being characteristic of that remote control device and being different according to the direction of rotation of said answer wheel to thereby enable differentiation between the operated condition of said remote control device; power operated means for rotating said answer wheel in either direction; means governed by said remote control device for governing said power operated means to cause the latter to rotate said answer wheel in a direction corresponding to the operated condition of said remote control device existing at that time; means controlled by said selector for discontinuing the operation of said power operated means at the end of a code; and means controlled by said selector for setting said power operated means into operation to obtain a verification of the indication last given.

30. An answerback signal system for railroads comprising a track signal biased to one indicating position and adapted when supplied with current to assume another indicating position, a circuit for supplying current to said signal, electromagnetic means and controlling circuits therefor adapted to open and close said signal operating circuit as said controlling circuits are selectively governed, a selector having separate contacts including said controlling circuits for the electromagnetic means, a pair of line wires to which the selector is connected, and means for operating the selector over the line wires to cause selective actuation of its contacts.

31. An answer back signaling system comprising a remote control device capable of assuming different operated conditions; a circuit for operating said device; a stick relay; means controlled by said stick relay for closing and opening said circuit according to the energized or deënergized condition of said stick relay; a pick up circuit and stick up circuit for said relay; a selector for independently controlling said pick up circuit and said stick up circuit; and means for controlling said selector from a distant point.

32. An answer back signaling system comprising a remote control device capable of assuming different operated conditions; and means including a stick relay for selectively governing the operated condition of said device from a distant point.

33. In an answer back mechanism, in combination; a remote control device capable of assuming different operated conditions; line wires; means for controlling said remote control device over said line wires from a distant point; an induction coil including a primary and secondary; a condenser included in series with said secondary; a source of current; answer back mechanism controlled by said remote control device for automatically connecting at predetermined intervals according to a code said source of current to the primary of said induction coil and for connecting the secondary of said induction coil to said line wires.

34. In an answer back mechanism, in combination: line wires; an induction coil having a primary and a secondary; a source of current; circuit controlling means arranged to connect said source of current to the primary of said induction coil and the secondary of said induction coil to said line wires; and answer back means for intermittently operating said circuit controlling means.

35. In an answer back mechanism, in combination: line wires; an induction coil having a primary and a secondary; a source of current; a circuit including said source of current and the primary of said induction coil; another circuit connecting the secondary of said induction coil across said line wires; circuit controlling means for closing both of said circuits when operated, said circuit controlling means interrupting each of said circuits at two points when in its unoperated position; and answer back means for intermittently operating said circuit controlling means.

36. In an answer back mechanism, in combination: line wires; an induction coil having a primary and a secondary; a source of current; a circuit including said source of current and the primary of said induction coil; another circuit for connecting the secondary of said induction coil across said line wires; circuit controlling means including three pairs of contacts and arranged to close both of said circuits when operated, said circuit controlling means interrupting each of said circuits at two points when in its unoperated condition; a revoluble answer wheel having teeth around its periphery in a predetermined series; means adapted to be engaged by the teeth of said answer wheel to operate said circuit controlling means; and means for rotating said answer wheel.

37. Answer back mechanism for railway signaling systems comprising an answer wheel provided with code teeth around its periphery arranged in a plurality of identical groups, each group consisting of two different numbers of teeth, and automatic means for rotating the answer wheel in either direction either continuously or for a predetermined portion of a revolution.

38. In an answer back mechanism, in combination: an answer wheel provided with contact points around its periphery arranged in a plurality of groups of different numbers of contact points following each other in the same sequence; circuit controlling means arranged to coöperate with the contact points of said answer wheel; an answer back circuit including a local source of current and said circuit controlling means; and means for rotating said answer wheel step by step in either direction, whereby different code indications are given according to the direction of rotation of said answer wheel.

39. Answer back mechanism comprising, an answer wheel having equally spaced teeth formed on its periphery, certain of said teeth in a predetermined sequence of groups of different numbers of teeth being longer than the remaining teeth; and electromagnetic means including pawls arranged to coöperate with said teeth for rotating said answer wheel step by step.

40. Answer back mechanism comprising, an answer wheel having its outer periphery provided with equally spaced teeth, some of said teeth being longer than the others and being arranged in a predetermined series for sending code impulses; circuit closing means operated successively by the longer teeth on said answer wheel; and electromagnetic means including pawls adapted to coöperate with said teeth for rotating said answer wheel step by step in either direction.

41. An answer back mechanism comprising, an answer wheel having equally spaced teeth around its periphery; and electromagnetic means including pawls adapted to coöperate with said teeth for rotating said answer wheel step by step in either direction.

42. An answer back mechanism comprising, an answer wheel having equally spaced teeth around its periphery; pawls arranged to coöperate with said teeth; and an oscillatory member connected to said pawls, one of said pawls being effective to advance the answer wheel in one direction if said oscillatory member is oscillated from its neutral position in one direction, and the other pawl being effective to advance said answer wheel in the opposite direction when said oscillatory member is oscillated from its neutral position in the opposite direction.

43. In an answer back mechanism, in combination: an answer wheel having its outer periphery provided with separated contact points; three rollers revolubly mounted on fixed axes and bearing against the inner periphery of said answer wheel; and circuit controlling means arranged in coöperative relation with said contact points.

44. In an answer back mechanism, in combination: an answer wheel having its outer periphery provided with separated contact points; two rollers revolubly mounted on fixed axes and bearing against the inner periphery of said answer wheel; a third revoluble roller arranged to bear on the inner periphery of said answer wheel and adjustably supported; and circuit closing means arranged in operative relation with said contact points.

45. In an answer back mechanism, in combination: an answer wheel having its outer periphery provided with teeth; three rollers revolubly mounted on fixed axes and bearing against the inner periphery of said answer wheel; circuit closing means arranged in coöperative relation with the teeth of said answer wheel; and means for rotating said answer wheel in either direction.

46. In an answer back mechanism, in combination: a revoluble answer wheel having teeth formed around its periphery in a plurality of predetermined code combinations; electromagnetic means for rotating said answer wheel step by step in either direction; circuits for controlling said electromagnetic means and determining the direction of rotation of said answer wheel; and circuit controlling means governed by said answer wheel for selectively governing said circuits.

47. In an answer back mechanism, in combination; an answer wheel provided with equally spaced teeth around its periphery; an oscillatory member; pawls loosely pivoted to said oscillatory member and extending in opposite directions therefrom, said pawls having hooked ends adapted to engage said teeth; and means for limiting the downward movement of each pawl and acting to guide that pawl in substantially the same direction as the direction of movement given to that pawl by said oscillatory member.

48. In an answer back mechanism, in combination: an answer wheel having equally spaced teeth around its periphery; electromagnetic means including pawls adapted to coöperate with said teeth for rotating said answer wheel step by step in either direction; and means for preventing said pawls from advancing said wheel more than one step for each operation of said electromagnetic means.

49. In an answer back mechanism, in combination: an answer wheel having equally spaced teeth around its periphery; a pawl adapted to coöperate with said teeth; means for operating said pawl from an idle position to an operated position; and means for holding said pawl in engagement with the teeth on said answer wheel when said pawl is in its operated position, whereby said answer wheel is locked against movement in either direction when said pawl is held in its operated position.

50. In an answer back mechanism, in combination: an answer wheel having equally spaced teeth around its periphery; pawls adapted to coöperate with said teeth; two electromagnets; an oscillatory armature controlled by said electromagnets and biased to assume a neutral position; and means connecting said armature and said pawls, whereby the successive energization of either of said electromagnets rotates said answer wheel step by step in one direction or the other direction.

51. In a signaling system, in combination: a remote control device; line wires; an answer wheel for sending code impulses over said line to a distant point; electromagnetic means for operating said answer wheel; and a controlling circuit for said electromagnetic means governed jointly by said remote control device and by said answer wheel.

52. In an answer back mechanism, in combination: an answer wheel provided with groups of different numbers of contact points arranged in a predetermined sequence around its periphery; circuit controlling means coöperating with said contact points; means for rotating said answer wheel; and means governed by said answer wheel for controlling said means to bring said answer wheel to a stop at a predetermined point in its movement, said predetermined point being such that said circuit controlling means is in position to coöperate with said contact points at the beginning of said sequence.

53. In an answer back mechanism, in combination: a revoluble answer wheel; a fixed contact; a contact arm spring pressed outwardly from the center of said answer wheel and carrying an insulating roller which bears on the inner periphery of said answer wheel; means carried by said contact arm for coöperating with said fixed contact, said answer wheel having a notch in its inner periphery permitting outward movement of said contact arm at a predetermined point in the rotation of said answer wheel; means for rotating said answer wheel; and a controlling circuit for said last mentioned means including said fixed contact and said contact arm.

54. In an answer back mechanism, in combination: a revoluble answer wheel; a fixed contact; a contact arm pressed outwardly from the axis of rotation of said answer wheel; a roller of insulating material carried by said contact arm which bears against the inner periphery of said answer wheel; means carried by said contact arm for coöperating with said fixed contact; said answer wheel having a notch in its inner periphery to permit the outward movement of said contact arm at a predetermined point in the rotation of said answer wheel; electromagnetic means for rotating said answer wheel step by step; an operating circuit for said electromagnetic means including said fixed contact and said contact arm; and means operated by said electromagnetic means for delaying the outward movement of said roller of said contact arm into the notch in said answer wheel until said notch is positioned opposite to said roller.

55. In an answer back mechanism, in combination: an answer wheel; means for rotating said answer wheel; an operating circuit for said means; circuit controlling means included in said circuit and governed by said answer wheel, said circuit controlling means being opened at a predetermined point in the movement of said answer wheel; other circuit controlling means included in said circuit and including a carbon contact; and means for controlling both of said circuit controlling means and operating to cause said other circuit controlling means to break contact first.

56. In an answer back mechanism, in combination: an answer wheel; electromagnetic means for rotating said answer wheel step by step when successively energized and deenergized; an operating circuit for said electromagnetic means; and means governed by said electromagnetic means for opening and closing said operating circuit successively as said electromagnetic means is energized and deënergized respectively.

57. In an answer back mechanism, in combination: an answer wheel; electromagnetic means for rotating said answer wheel step by step when successively energized and deënergized; an oscillatory armature controlled by said electromagnetic means; an operating circuit for said electromagnetic means; and circuit controlling means operated by said oscillatory armature for opening and closing said circuit when said electromagnetic means is energized and deënergized respectively.

58. In an answer back mechanism, in combination: an answer wheel; two electromagnets; an armature controlled by said electromagnets and biased to assume a neutral position; means governed by said armature for rotating said answer wheel step by step in one direction when one of said electromagnets is successively energized and deënergized and for rotating said answer wheel in the other direction when the other electromagnet is successively energized and deenergized; another armature positioned between said electromagnets and mounted to oscillate; operating circuits for said electromagnets; and circuit controlling means governed by said other armature for governing said circuits selectively and for opening and closing the circuit for either electromagnet when that electromagnet is energized and deënergized respectively.

59. In a signaling system for railroads, in combination: a remote control device capable of assuming different operated conditions; a selector controlled from a distant point; a stick relay for governing said remote control device; a pick up circuit and a stick circuit for said stick relay governed by said selector; electrically operated answer back means; two operating circuits governed by said remote control device for said answer back means which render said answer back means effective to cause a persistent distinctive indication to be given at said distant point for each operated condition of said remote control device; a stop relay selectively governing said operating circuits and controlled jointly by said stick relay and by said selector; two other operating circuits for said answer back means governed by said means itself and rendering said means effective to give indications at said distant point of the existing operated condition of said remote control device for a limited period; and means controlled by said selector for rendering said last mentioned operating circuits effective without changing the operated condition of said remote control device.

60. In an answer back mechanism, in combination: electromagnets having common lower pole pieces and separate upper pole pieces, and an oscillatory armature supported between said electromagnets, the lower edge of said armature and the common lower pole piece of said electromagnets being shaped to maintain substantially the same air gap between said armature and said lower pole piece during the oscillation of said member.

61. In an answer back mechanism, in combination: two independent electromagnets; an armature governed by said electromagnets; a controlling circuit for each electromagnet; an oscillatory member controlled by either electromagnet; an answer wheel; means operated by said armature for rotating said answer wheel; a circuit controller governed by said oscillatory member and adapted to intermittently break and make said controlling circuits; and means for selectively governing said controlling circuits.

62. In an answer back mechanism, in combination: an electromagnet; an armature governed by said electromagnet; a circuit for operating said electromagnet; a second oscillatable armature controlled by said electromagnet and having a period of oscillation greater than that of the first mentioned armature; an answer wheel; means operated by said first mentioned armature for rotating said answer wheel step by step; and circuit controlling means governed by said second armature for intermittently breaking and making said operating circuit.

63. In an answer back mechanism, in combination: an answer wheel; two electromagnets; means including an armature governed by said electromagnets for rotating said answer wheel step by step, said armature being fulcrumed near its middle and being arranged to have its respective ends attracted by the corresponding electromagnet; a member bearing against said armature on opposite sides of its fulcrum; and resilient means for pressing said member toward said electromagnets.

64. In a signaling system, in combination: a remote control device; answer back means, governed by said remote control device for giving, at a distant point, an indication of the operated condition of said remote control device; a plurality of circuits for controlling said remote control device and said answer back means; and means for selectively controlling said plurality of circuits including means for governing some of said circuits simultaneously.

65. In a signaling system, in combination: a remote control device; answer back means governed by said remote control device for giving, at a distant point repeated code indications of the operated condition of said remote control device; a plurality of circuits for controlling said remote control device and said answer back means; a selector capable of selectively controlling said plurality of circuits; means controlling said selector to selectively control said circuits; and means included in said selector for controlling some of said circuits simultaneously.

66. In an answer back mechanism, in combination: means for making answer back impulses when operated, said means being operated by current intermittently supplied thereto; a circuit for operating said means; circuit controlling means included in said circuit and having two pairs of contacts in multiple, one of said pairs of contacts having a carbon contact point; and means for automatically opening and closing said circuit controlling means, said last mentioned means operating to break last the pair of contacts having a carbon contact point.

67. In an answer back mechanism, an automatic make and break device comprising a coil, a biased oscillatory armature operated by the energization and deënergization of said coil, a fixed contact, a movable contact, a circuit for said coil, including said contacts, and means connected to said oscillatory armature for actuating said movable contact, said movable contact being actuated by a certain angular movement of said armature and being held in this actuated position during further angular movement of said armature.

68. In an answer back mechanism, an automatic make and break device comprising a coil, an oscillatory armature governed by said coil, a fixed contact, a movable contact arranged in coöperative condition with said fixed contact, a circuit for energizing said coil including said contacts, a crank arm secured to said armature, and a roller of insulating material fastened to said crank arm at its outer end, said movable contact having a curved portion adapted to coöperate with said roller as said armature is actuated, said curved portion of said movable contact being shaped to permit oscillation of said armature beyond a predetermined point without causing further movement of said movable contact.

69. Answer back mechanism comprising a fixed contact; a resilient contact arranged in coöperative relation with said fixed contact; an adjustable stop for limiting the movement of said movable contact in one direction, said stop comprising a member of insulating material; and means eccentrically supporting said member and securing it in its adjusted position.

70. In a signaling system, in combination: a remote control device; a selector; a stick relay governed by said selector for controlling said remote control device; an answer wheel; electromagnetic means for rotating said answer wheel; a stop relay governed by said selector and said stick relay; an operating circuit for said electromagnetic means governed by said remote control device and by said stop relay; and another operating circuit for said electromagnetic means governed by said answer wheel and by said remote control device.

71. In a signaling system, in combination: a line circuit; a remote control device selectively governed over said line circuit from a central station; an answer back mechanism governed by said remote control device; a local source of energy for supplying current for operating said device and said mechanism; and means operated by said answer back mechanism for intermittently connecting said local source of energy to said line circuit for sending impulses in code over said line circuit to said central station to indicate the operated condition of said remote control device.

72. In a signaling system, in combination: a remote control device; a selector for governing said device; answer back means; electromagnetic means for operating said answer back means; an operating circuit for said electromagnetic means governed jointly by said remote control device and by said selector; a second operating circuit for said electromagnetic means governed by said answer back means and by said remote control device; and a third operating circuit for said electromagnetic means governed by said selector, said third operating circuit causing a partial operation of said electromagnetic means and thereby placing said electromagnetic means under the control of said second mentioned circuit.

73. In a signaling system, in combination: a remote control device capable of assuming different operated conditions; means for governing said device from a distant point; and means governed by said device for automatically giving an indication at said distant point of a change in the operated condition of said device occurring independently of the operation of said first mentioned means.

74. In a signaling system, in combination: a remote control device capable of assuming different operated conditions; means for governing said device from a distant point; and means for automatically giving a persistent indication at said distant point whenever said remote control device changes its operated condition independently of the operation of said first mentioned means.

75. In a signaling system, in combination:

a remote control device capable of assuming different operated conditions; means at a distant point for selectively governing the operated condition of said device; answer back mechanism governed by said remote control device for sending to said distant point indications which have different characteristics according to the operated condition of said device, said mechanism being automatically set into operation whenever the remote control device changes its operated condition to send to said distant point a persistent indication of the then existing condition of the said device; and means for discontinuing said persistent indications which means is governed by said first mentioned means and can be rendered effective only by changing the condition of said first mentioned means to correspond to the operated condition of said device then existing.

76. In a signaling system, in combination: a remote control device capable of assuming different operated conditions; means for governing said device from a distant point; answer back mechanism governed by said device for giving at said distant point a persistent indication of the operated condition of said device after said device has changed its operated condition; and means for discontinuing said indications and for simultaneously placing said answer back mechanism in condition to give an indication at said distant point whenever said remote control device changes its operated condition independently of the operation of said first mentioned means.

77. In a signaling system, in combination: a remote control device capable of assuming different operated conditions; operating circuits for said device; means for controlling said operating circuits from a distant point; answer back mechanism; other operating circuits for said answer back mechanism governed by said remote control device and energizing said answer back mechanism to cause a persistent indication at said distant point when said device changes its operated condition; electrically operated means for electrically closing one of said operating circuits of said answer back mechanism and for opening the other of these operating circuits; and means governed by said first mentioned operating circuits for governing said electrically operated means.

78. In a signaling system, in combination: a line circuit; a remote control device selectively controlled over said line circuit from a central station; an answer back mechanism governed by said device; a local source of energy for supplying current to operate said device and said mechanism; a normally open circuit connected to said line circuit; and means operated by said answer back mechanism for intermittently energizing said circuit from said local source of energy to send impulses in code over said line circuit to indicate the operated condition of said remote control device.

79. In an answer back signaling system, in combination: a signal capable of assuming different operated positions; a circuit controller associated with said signal and operated thereby; answer back mechanism comprising an answer wheel; a stop relay; two circuits, each including a contact on said circuit controller and one on said stop relay in a position corresponding to the position of the signal, for selectively controlling said answer back mechanism when said signal is operated from one position to another to cause said answer wheel to be rotated continuously in either direction and means selectively controlled from a central station for governing said stop relay when said signal is in either of its operated positions for interrupting either of said circuits.

80. In an answer back signaling system, in combination: a signal capable of assuming different operated positions; answer back mechanism comprising an answer wheel; two pairs of circuits governed by said signal, one of said pairs of circuits being adapted to selectively control said answer back mechanism to cause said answer wheel to be rotated continuously in either direction according to the operated position of said signal and the other of said pairs of circuits being adapted to selectively control said answer back mechanism to cause said answer wheel to be rotated in either direction for a limited period; and means selectively controlled from a central station for interrupting either of said circuits in said first pair.

81. Answer back mechanism comprising a code wheel; a circuit for operating said answer back mechanism to give one indication; said answer back mechanism being operated so long as said circuit is closed; a signal; means for permitting said circuit to be closed if said signal is in a corresponding position; means controlled over a line circuit from a central station for opening said circuit and means operated in accordance with the movement of the code wheel for maintaining said circuit closed independently of said first mentioned means until said code wheel reaches a predetermined position whereby after each operation said code wheel is stopped after the completion of a code.

RICHARD C. LEAKE.

Witnesses:
 HERBERT B. TAYLOR,
 SOPHIE LEVIN.